US012424795B2

(12) United States Patent
Li et al.

(10) Patent No.: US 12,424,795 B2
(45) Date of Patent: Sep. 23, 2025

(54) RECEPTACLE CONNECTOR ASSEMBLY AND CONNECTOR ASSEMBLY WITH IMPROVED INSERTION RELIABILITY

(71) Applicant: DONGGUAN LUXSHARE TECHNOLOGIES CO., LTD, Dongguan (CN)

(72) Inventors: Tiesheng Li, Dongguan (CN); Rongzhe Guo, Dongguan (CN); Hongji Chen, Dongguan (CN); Zhaolong Zeng, Dongguan (CN); Sihai Yi, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 386 days.

(21) Appl. No.: 17/979,604

(22) Filed: Nov. 2, 2022

(65) Prior Publication Data

US 2023/0327378 A1 Oct. 12, 2023

(30) Foreign Application Priority Data

Apr. 11, 2022 (CN) ......................... 202210371851.1

(51) Int. Cl.

| | |
|---|---|
| ***H01R 13/6471*** | (2011.01) |
| ***H01R 12/71*** | (2011.01) |
| ***H01R 13/516*** | (2006.01) |
| ***H01R 13/629*** | (2006.01) |
| ***H01R 13/66*** | (2006.01) |
| *H01R 13/627* | (2006.01) |
| *H01R 13/633* | (2006.01) |

(52) U.S. Cl.

CPC ......... *H01R 13/6471* (2013.01); *H01R 12/71* (2013.01); *H01R 13/516* (2013.01);

(Continued)

(58) Field of Classification Search

CPC ......................... H01R 13/6471; H01R 13/516; H01R 13/629; H01R 13/665; H01R 12/71

(Continued)

(56) References Cited

U.S. PATENT DOCUMENTS

| | | | | |
|---|---|---|---|---|
| 6,556,446 B1 * | 4/2003 | Hwang ................ | G02B 6/4201 361/740 |
| 7,090,509 B1 * | 8/2006 | Gilliland .............. | G02B 6/4277 439/76.1 |

(Continued)

FOREIGN PATENT DOCUMENTS

| | | |
|---|---|---|
| CN | 201097418 Y | 8/2008 |
| CN | 106159564 A | 11/2016 |

(Continued)

*Primary Examiner* — Gary F Paumen

(74) *Attorney, Agent, or Firm* — Birch, Stewart, Kolasch & Birch, LLP

(57) ABSTRACT

A receptacle connector assembly includes a receptacle connector and a metal cage. The metal cage includes a first insertion space and a first opening located at a rear end of the first insertion space. The receptacle connector is accommodated in the metal cage through the first opening. The metal cage includes a first wall portion, a second wall portion, a third wall portion and a fourth wall portion which are enclosed to form a first frame. The third wall portion and/or the fourth wall portion is provided with a first guide protrusion protruding into the first insertion space. The first guide protrusion is configured to be inserted into a slot of a plug connector, thereby improving the mating stability. A connector assembly having the receptacle connector assembly is also disclosed.

20 Claims, 30 Drawing Sheets

(52) U.S. Cl.
CPC ......... *H01R 13/629* (2013.01); *H01R 13/665* (2013.01); *H01R 13/6275* (2013.01); *H01R 13/6335* (2013.01)

(58) Field of Classification Search
USPC .......................................................... 439/108
See application file for complete search history.

(56) References Cited

U.S. PATENT DOCUMENTS

| | | | | | |
|---|---|---|---|---|---|
| 7,641,519 | B1 * | 1/2010 | Chen | H01R 13/41 | 439/607.54 |
| 2007/0197060 | A1 * | 8/2007 | Wang | H01R 13/6593 | 439/92 |
| 2016/0336691 | A1 * | 11/2016 | De Boer | H01R 13/6585 | |

FOREIGN PATENT DOCUMENTS

| | | | | |
|---|---|---|---|---|
| CN | 208955288 U | 6/2019 | | |
| CN | 113437556 A | 3/2021 | | |
| CN | 113555716 A | 10/2021 | | |
| CN | 114024160 A | 2/2022 | | |
| TW | 529798 U | 4/2003 | | |
| TW | 201628279 A | 8/2016 | | |
| WO | WO-2006091255 A1 * | 8/2006 | | H01R 12/7005 |

* cited by examiner

RECEPTACLE CONNECTOR ASSEMBLY AND CONNECTOR ASSEMBLY WITH IMPROVED INSERTION RELIABILITY

CROSS-REFERENCE TO RELATED APPLICATION

This patent application claims priority of a Chinese Patent Application No. 202210371851.1, filed on Apr. 11, 2022 and titled "RECEPTACLE CONNECTOR ASSEMBLY AND CONNECTOR ASSEMBLY", the entire content of which is incorporated herein by reference.

TECHNICAL FIELD

The present disclosure relates to a receptacle connector assembly and a connector assembly, which belongs to a technical field of connectors.

BACKGROUND

A connector assembly in the related art generally includes a receptacle connector and a plug connector mating with the receptacle connector. The plug connector includes a housing, a tongue plate and a cable. At least one surface of the tongue plate is provided with a plurality of conductive pads. The plug connector includes a mating surface. The tongue plate generally extends beyond the mating surface.

In order to improve the mating stability of the plug connector when the plug connector is inserted into the receptacle connector, the plug connector in the related art further includes an extension plate extending beyond the mating surface. The extension plate and the tongue plate are parallel to each other.

However, in the process of mating the plug connector with the receptacle connector, how to further ensure the insertion position of the plug connector to avoid damage to the tongue plate and the conductive pads thereon due to insertion deviation, is a technical problem that needs to be solved by those skilled in the art.

SUMMARY

An object of the present disclosure is to provide a receptacle connector assembly and a connector assembly with high insertion reliability.

In order to achieve the above object, the present disclosure adopts the following technical solution: a receptacle connector assembly, including: a receptacle connector; and a metal cage shielding the receptacle connector; wherein the receptacle connector includes an insulating body and a plurality of conductive terminals secured to the insulating body, the insulating body includes an insertion surface and an insertion slot extending through the insertion surface, each conductive terminal includes an elastic mating portion extending into the insertion slot; wherein the metal cage includes a first insertion space and a first opening located at a rear end of the first insertion space along a mating direction, the receptacle connector is accommodated in the metal cage through the first opening, the insertion slot communicates with the first insertion space; wherein the metal cage includes a first wall portion, a second wall portion opposite to the first wall portion, a third wall portion connected to the first wall portion, and a fourth wall portion opposite to the third wall portion; the first wall portion, the second wall portion, the third wall portion and the fourth wall portion are enclosed to form a first frame; the first insertion space extends through the first frame in a direction opposite to the mating direction; the third wall portion and/or the fourth wall portion is provided with a first guide protrusion which extends into the first insertion space, and the first guide protrusion is configured to be inserted into a slot of a plug connector.

In order to achieve the above object, the present disclosure adopts the following technical solution: a connector assembly, including: a plug connector including: a housing including a mating surface; a built-in circuit board partially located in the housing, the built-in circuit board including a tongue plate and a plurality of conductive pads located on the tongue plate; and a cable electrically connected to the built-in circuit board; wherein the housing includes an extension plate extending in a mating direction of the plug connector, both the tongue plate and the extension plate extend beyond the mating surface along the mating direction, and the extension plate extends beyond the tongue plate along the mating direction; at least one side of the plug connector further defines a slot extending through the mating surface; and the receptacle connector assembly described above; wherein when the plug connector is inserted into the receptacle connector assembly, the first guide protrusion supports and guides the extension plate; and when the plug connector is inserted in place, the tongue plate is inserted into the insertion slot, the elastic mating portions of the conductive terminals engage with the conductive pads, and the first guide protrusion is inserted into the slot.

Compared with the prior art, the present disclosure provides the first guide protrusion extending into the first insertion space. The first guide protrusion supports and guides the extension plate of the plug connector when the plug connector is inserted into the receptacle connector assembly. When the plug connector is inserted in place, the first guide protrusion is inserted into the slot of the plug connector, thereby improving the mating stability.

DETAILED DESCRIPTION

Figure 1:
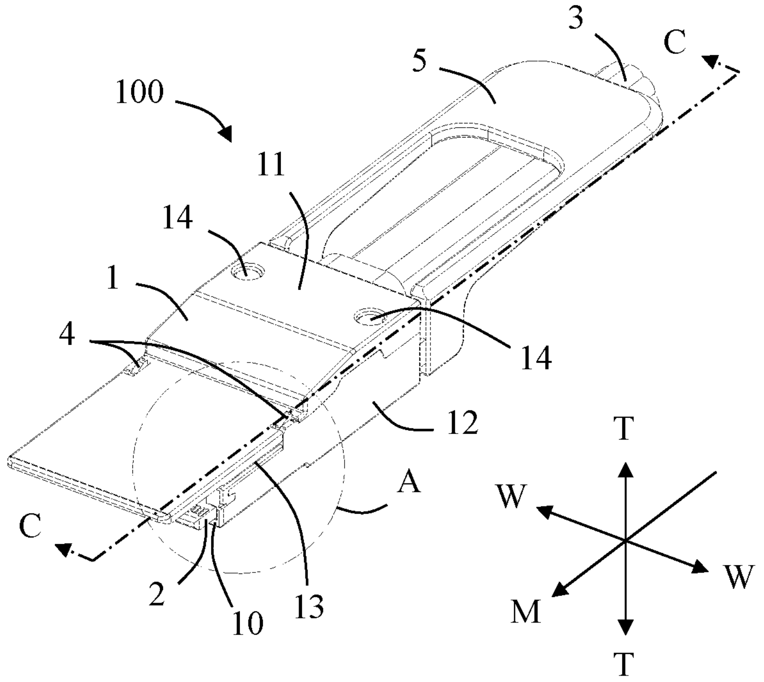
FIG. 1 is a perspective schematic view of a plug connector in accordance with an embodiment of the present disclosure.
Figure 2:
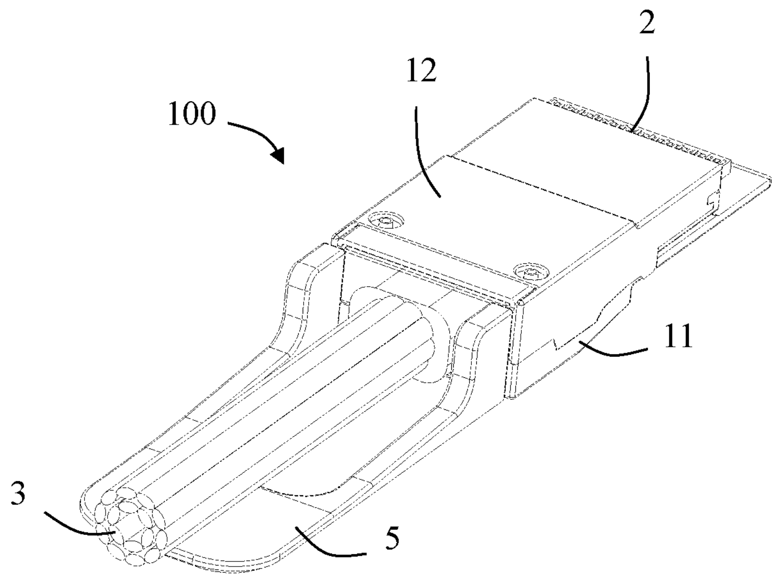
FIG. 2 is a perspective schematic view of FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 10, the present disclosure discloses a plug connector 100 including a housing 1, a built-in circuit board 2 partly located in the housing 1, a cable 3 electrically connected to the built-in circuit board 2, a locking mechanism 4 installed in the housing 1, and a pull strap 5 connected with the locking mechanism 4. In an embodiment of the present disclosure, the plug connector 100 is a high-speed interconnect plug connector, including but not limited to, a plug connector based on SFP (Small Form Factor Pluggable), QSFP (Quad Small Form Factor Pluggable), OSFP (Octal Small Form Factor Pluggable), QSFP-DD (Quad Small Form Factor Pluggable-Double Density), SFP-DD (Small Form Factor Pluggable-Double Density) or DSFP (Dual Chanel Small Form-factor Pluggable). The plug connector 100 is adapted to mate with a receptacle connector assembly 200 along a mating direction M so as to realize high-speed data transmission. Correspondingly, a receptacle connector 201 of the receptacle connector assembly 200 is a receptacle connector based on SFP (Small Form Factor Pluggable), QSFP (Quad Small Form Factor Pluggable), OSFP (Octal Small Form Factor Pluggable), QSFP-DD (Quad Small Form Factor Pluggable-Double Density), SFP-DD (Small Form Factor Pluggable-Double Density) or DSFP (Dual Chanel Small Form-factor Pluggable).

Referring to FIGS. 1 to 6, in the illustrated embodiment of the present disclosure, the housing 1 includes a first housing 11 and a second housing 12. The housing 1 includes a mating surface 10 and two slots 13 located on opposite sides (for example, a left side and a right side) of the plug connector 100 and extending through the mating surface 10. The slots 13 can be adapted to mate with guide protrusions 89 of the receptacle connector 201 (shown in FIG. 27), which is beneficial to improve the insertion reliability of the plug connector 100.

Figure 7:
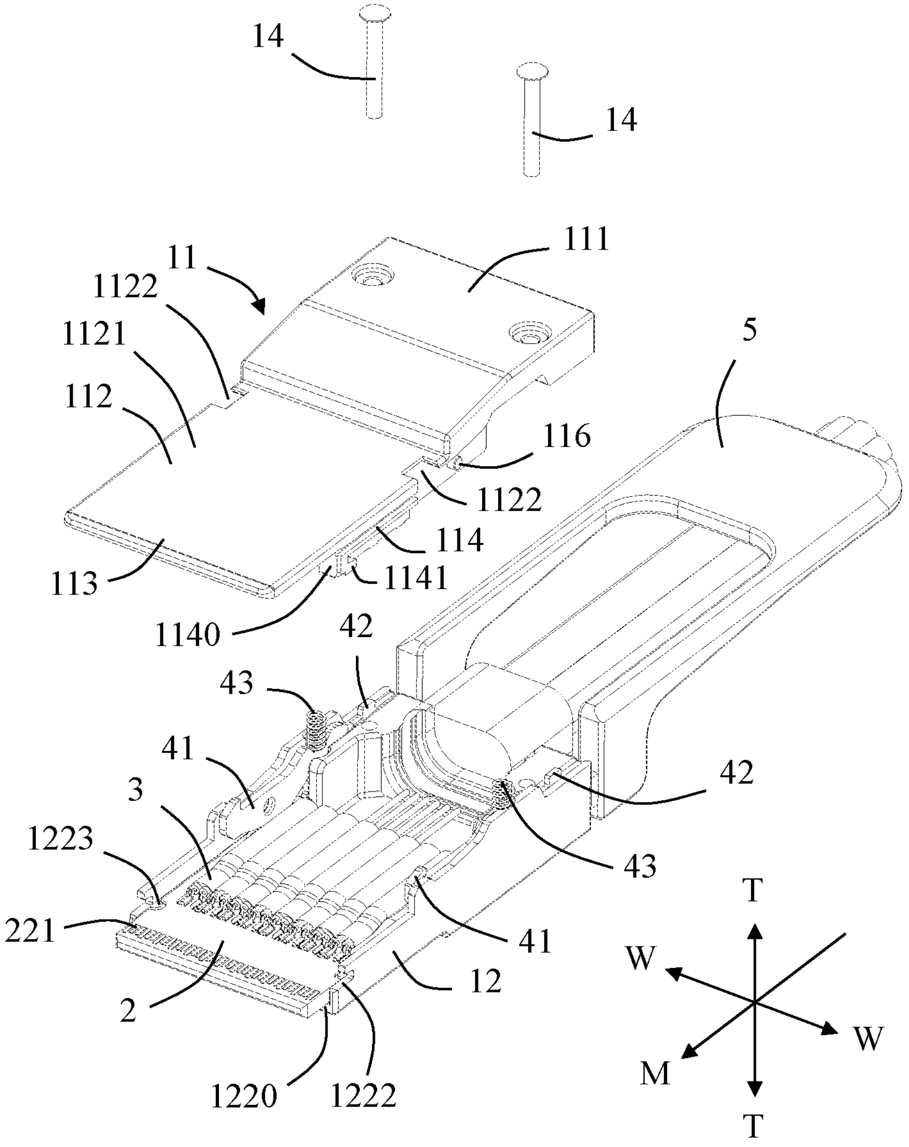
FIG. 7 is a partially exploded perspective view of FIG. 1.
Figure 8:
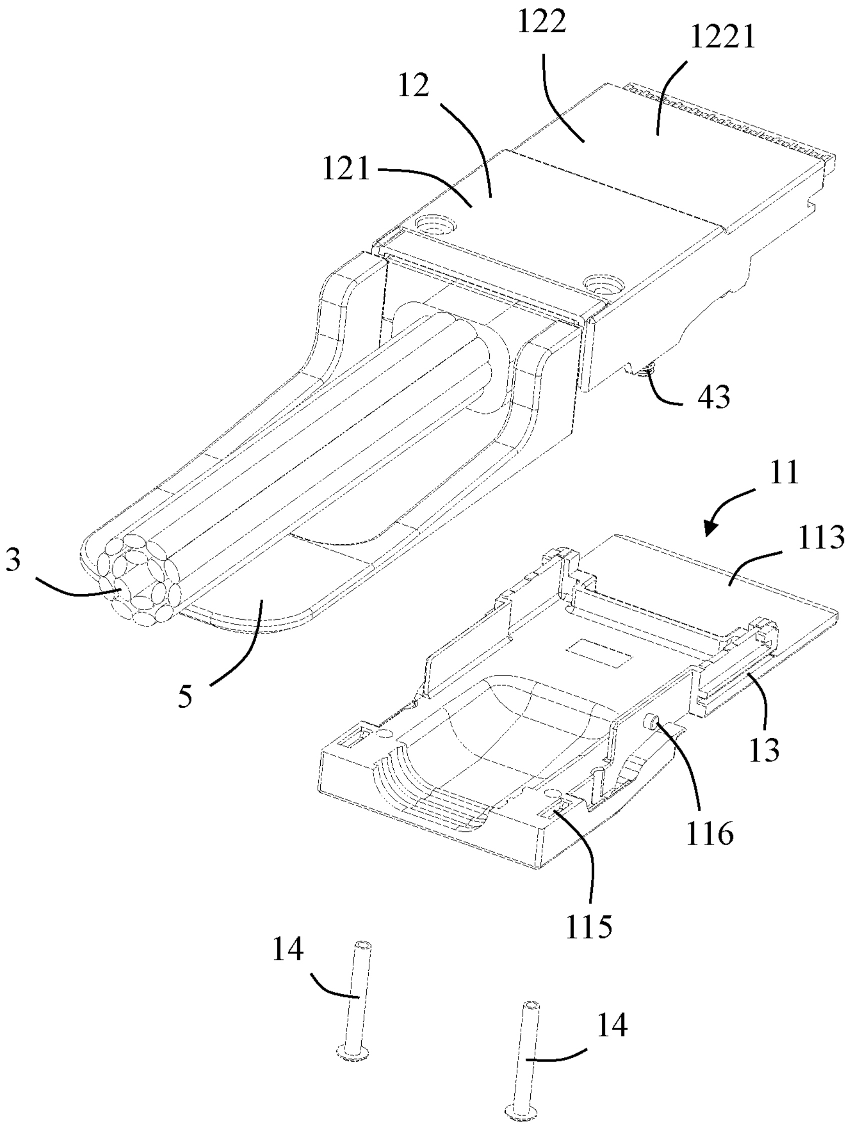
FIG. 8 is a partial perspective exploded view of FIG. 7 from another angle.

Referring to FIGS. 7 and 8, the first housing 11 includes a first base 111, a first extension portion 112 extending from the first base 111, and an extension plate 113 extending from the first extension portion 112. The first extension portion 112 includes a first surface 1121 (for example, an upper surface) and two openings 1122 extending through the first surface 1121 along a thickness direction T-T of the plug connector 100. The openings 1122 are located on opposite sides (for example, a left side and a right side) of the first extension portion 112 along a width direction W-W of the plug connector 100. Referring to FIG. 7, it is understandable to those skilled in the art that in the illustrated embodiment of the present disclosure, the mating direction M is a rear-to-front direction, the width direction W-W is a left-right direction, and the thickness direction is a vertical direction. The mating direction M, the width direction W-W and the thickness direction T-T are perpendicular to each other. In the illustrated embodiment of the present disclosure, the first extension portion 112 includes two convex portions 114 which protrude downwardly along the thickness direction T-T and are located on opposite sides (for example, a left side and a right side) of the first extension portion 112. Each convex portion 114 extends along the mating direction M. The convex portion 114 includes a first front end surface 1140 and a locking portion 1141 located at a front portion of the convex portion 114. In the illustrated embodiment of the present disclosure, the first front end surface 1140 is a vertical surface. The locking portion 1141 is of a U-shaped configuration.

The second housing 12 includes a second base 121 and a second extension portion 122 extending from the second base 121. The first base 111 corresponds to the second base 121, wherein the first base 111 is located above the second base 121 as a whole, and the first base 111 and the second base 121 are aligned in the vertical direction. The first extension portion 112 corresponds to the second extension portion 122, wherein the first extension portion 112 is located above the second extension portion 122 as a whole, and the first extension portion 112 and the second extension portion 122 are aligned in the vertical direction. The second extension portion 122 includes a second front end surface 1220. The first front end surface 1140 and the second front end surface 1220 are aligned with each other in the thickness direction T-T to jointly form the mating surface 10. The second extension portion 122 includes a second surface 1221 (for example, a lower surface). The first surface 1121 and the second surface 1221 are disposed opposite to each other along the thickness direction T-T. A front side of the second extension portion 122 includes a locking slot 1222. In the illustrated embodiment of the present disclosure, the locking slot 1222 is of a U-shaped configuration. The locking portion 1141 is fixed in the locking slot 1222 to prevent the first housing 11 and the second housing 12 from being separated from each other in the thickness direction T-T. The second extension portion 122 further includes two positioning posts 1223 on opposite sides. The positioning posts 1223 are adapted for positioning the built-in circuit board 2. A rear side of the second extension portion 122 is further provided with a limiting protrusion 1224 which protrudes into a corresponding opening 1122 along the thickness direction T-T.

In the illustrated embodiment of the present disclosure, the plug connector 100 further includes a bolt 14 to assemble and fix the first base 111 and the second base 121. Of course, in other embodiments, the first housing 11 and the second housing 12 may be assembled through a mutual locking structure (for example, a locking arm and a locking groove for mating with the locking arm).

Figure 9:
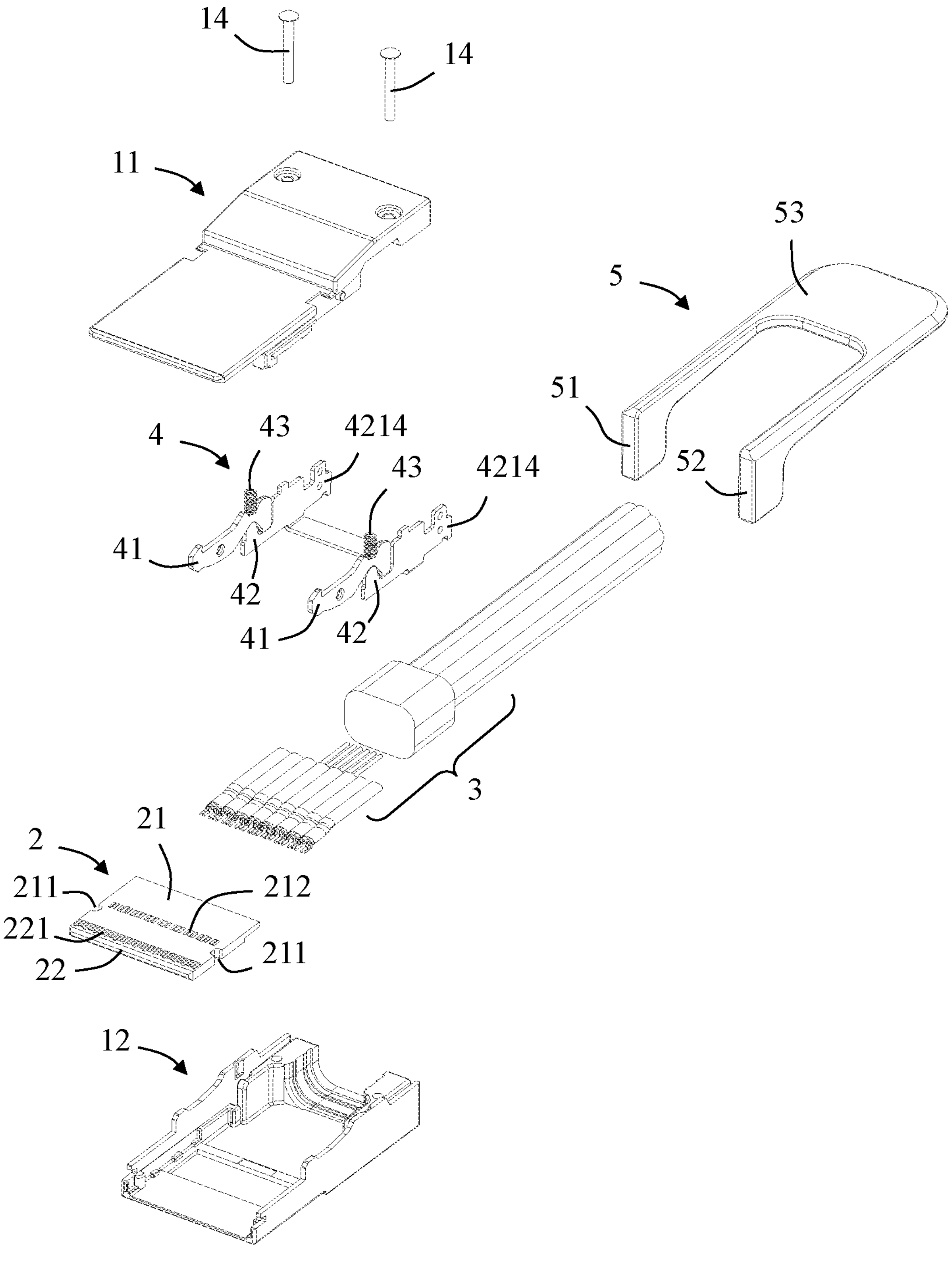
FIG. 9 is a further partial perspective exploded view of FIG. 7.
Figure 10:
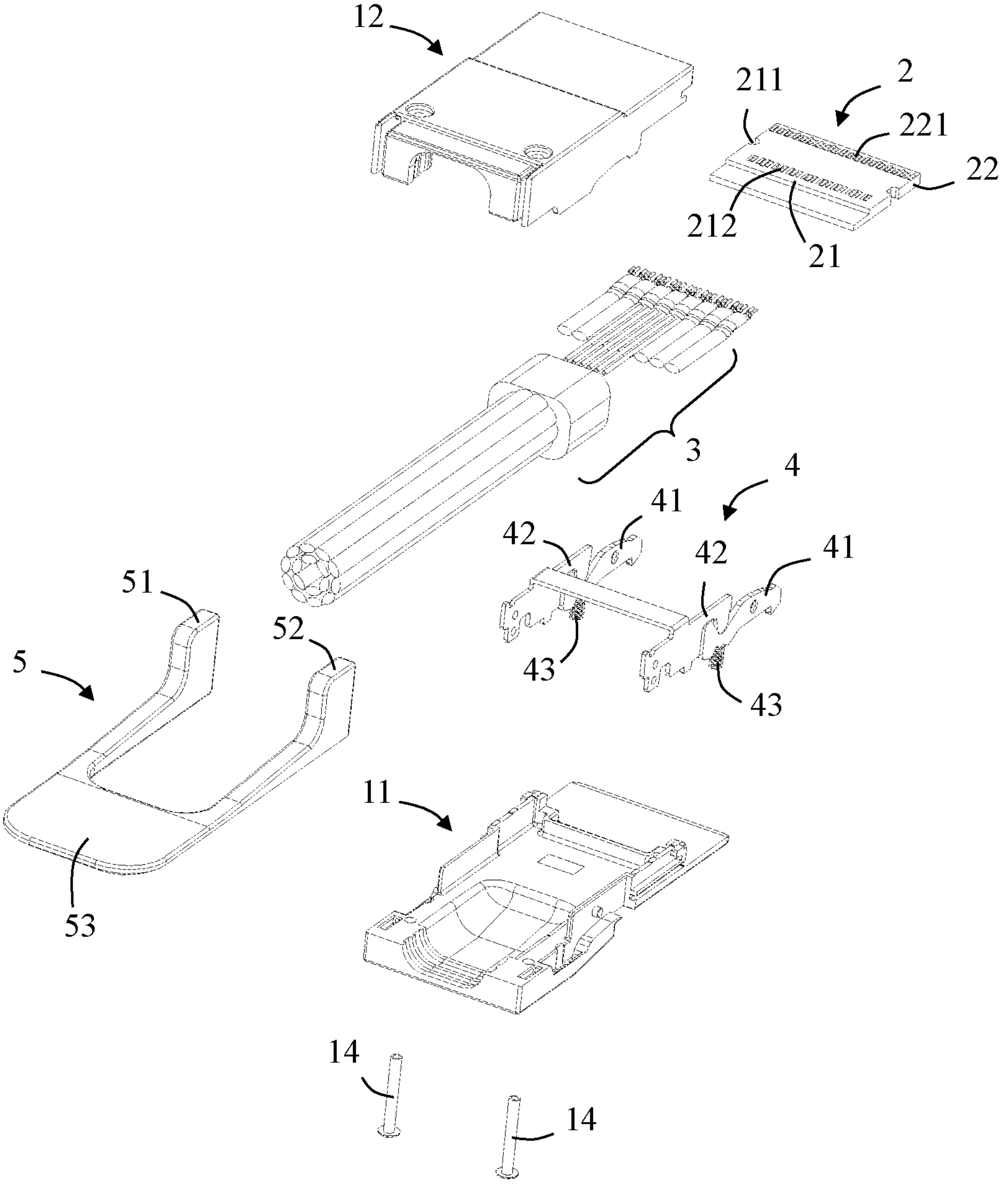
FIG. 10 is a partial perspective exploded view of FIG. 9 from another angle.
Figure 11:
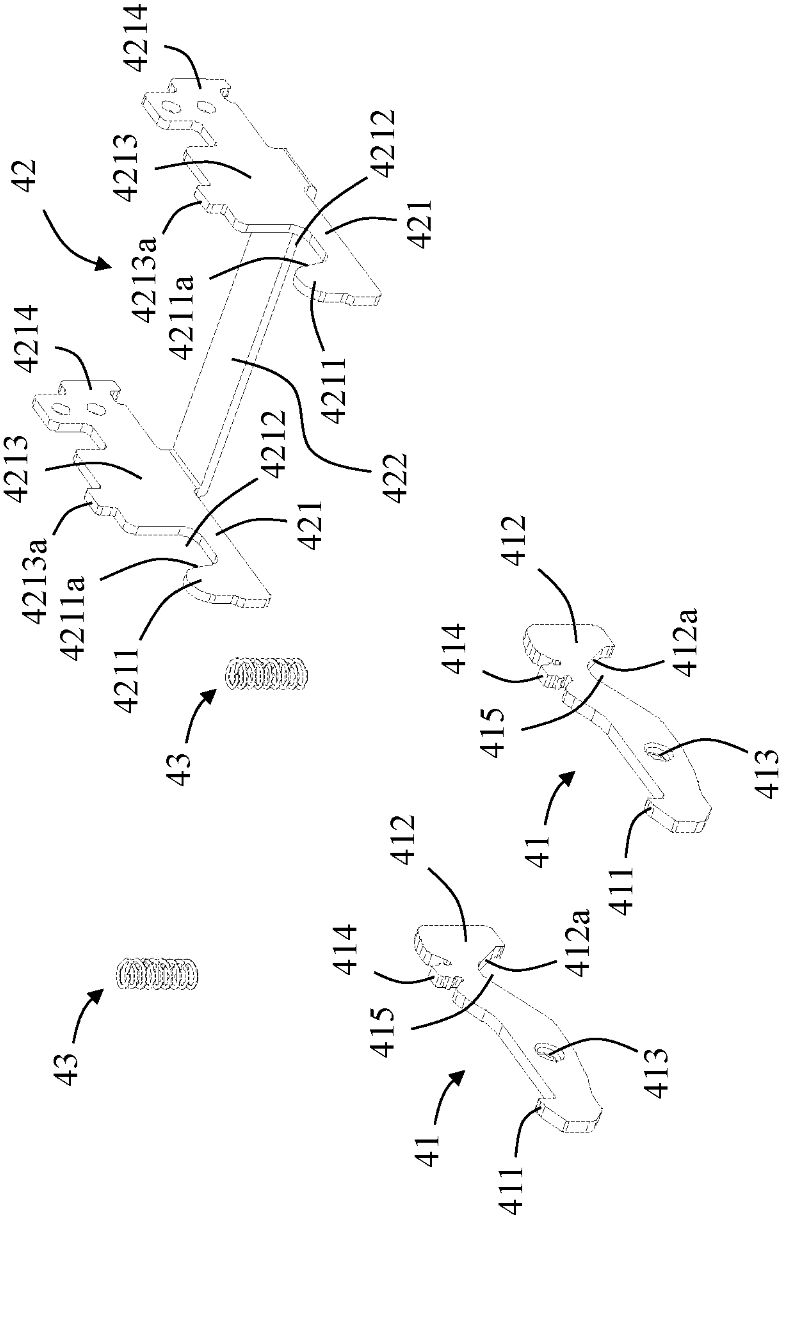
FIG. 11 is a perspective exploded view of two return springs, two locking arms and a driving member in FIG. 9.
Figure 12:
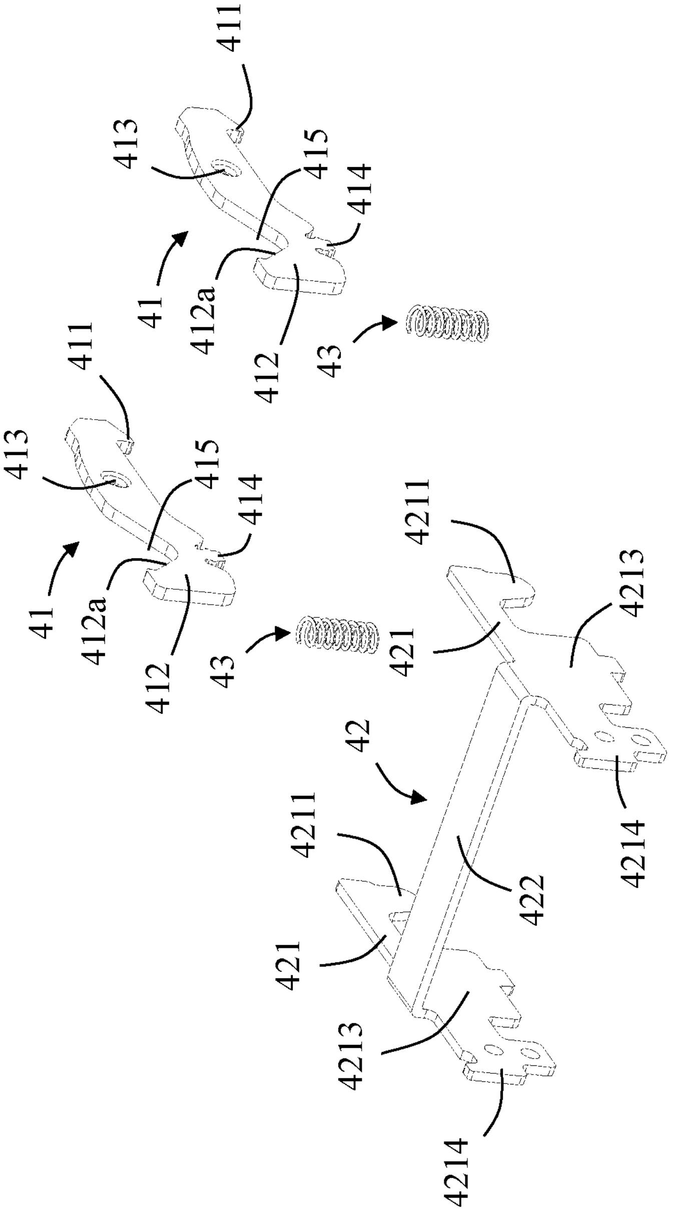
FIG. 12 is a perspective exploded view of FIG. 11 from another angle.
Figure 13:
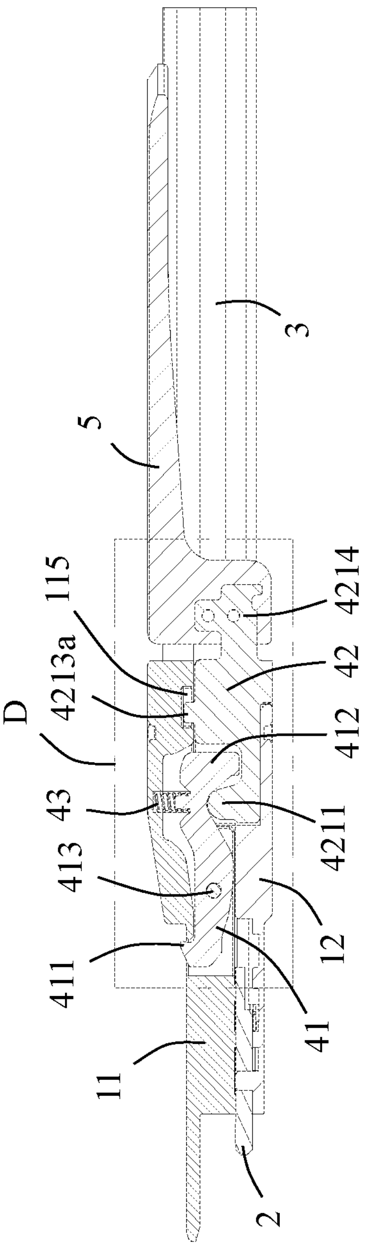
FIG. 13 is a schematic cross-sectional view taken along line C-C in FIG. 1, wherein the locking arm is located at a locked position.
Figure 14:
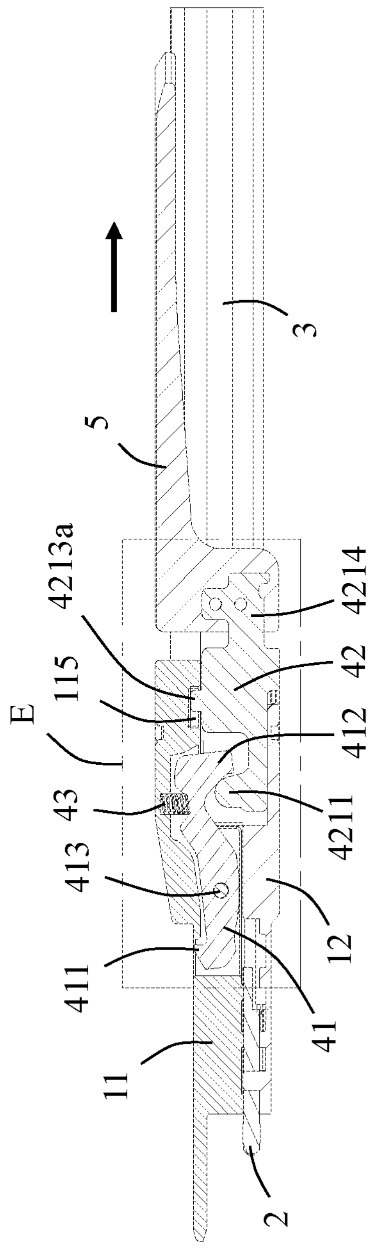
FIG. 14 is a schematic cross-sectional view of another state in FIG. 13, wherein the locking arm is located at an unlocked position.

Referring to FIGS. 7, 9 and 10, the built-in circuit board 2 includes a base plate 21 at least partially clamped between the first extension portion 112 and the second extension portion 122, and a tongue plate 22 extending forward from the base plate 21. Opposite sides of the base plate 21 include two positioning notches 211 matched with the positioning posts 1223. At least one surface of the base plate 21 is provided with a plurality of soldering pads 212 which are adapted for being soldered and fixed with the cable 3. In the illustrated embodiment of the present disclosure, two opposite surfaces (for example, an upper surface and a lower surface) of the base plate 21 are respectively provided with the soldering pads 212, which is beneficial to maximize the use of the space of the base plate 21 as much as possible. A plurality of conductive pads 221 are provided on at least one surface of the tongue plate 22. The conductive pads 221 are adapted to contact the conductive terminals of the receptacle connector 201 so as to realize data transmission. In the illustrated embodiment of the present disclosure, the two opposite surfaces (for example, the upper surface and the lower surface) of the tongue plate 22 are respectively provided with the conductive pads 221, which is beneficial to maximize the use of the space of the tongue plate 22 as much as possible.

Figure 3:
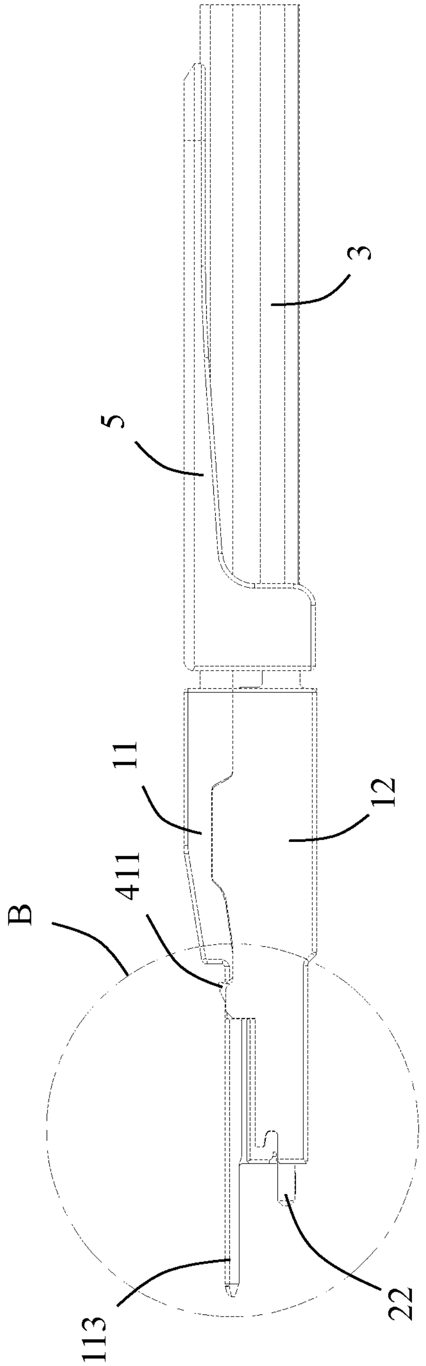
FIG. 3 is a right side view of FIG. 1.
Figure 4:
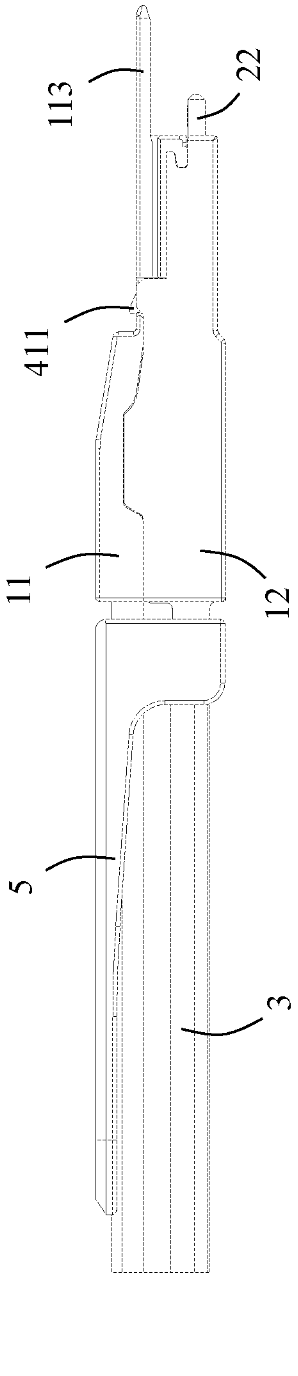
FIG. 4 is a left side view of FIG. 1.
Figure 6:
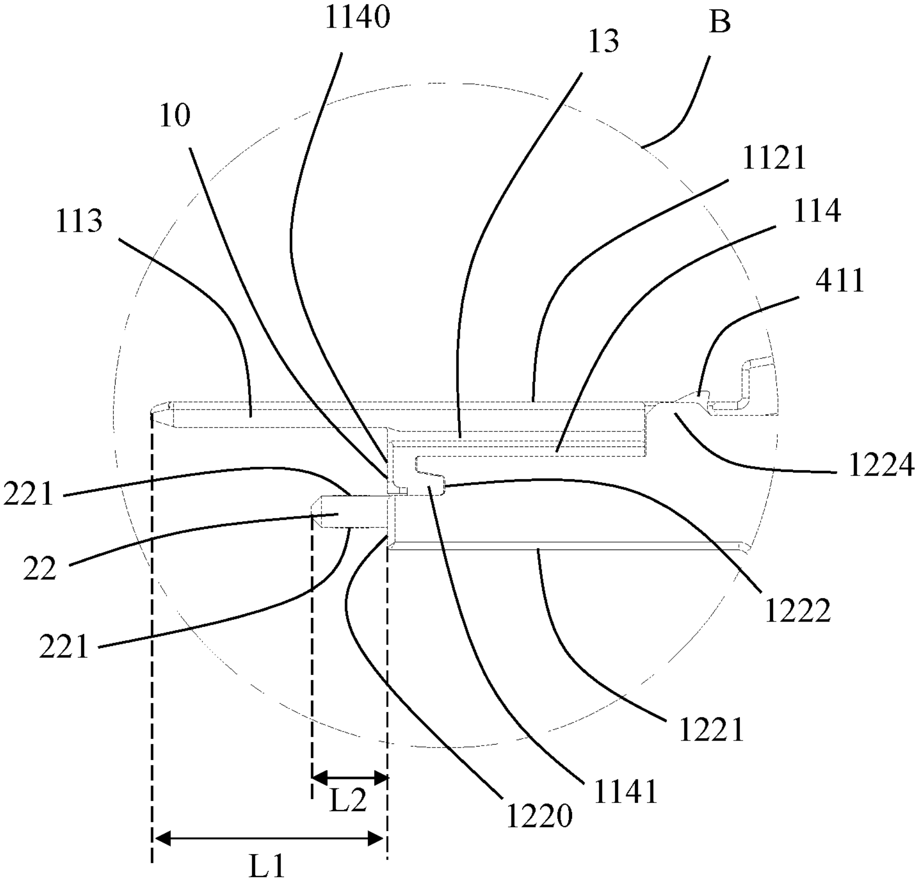
FIG. 6 is a partial enlarged view of a circled part B in FIG. 3.
Figure 17:
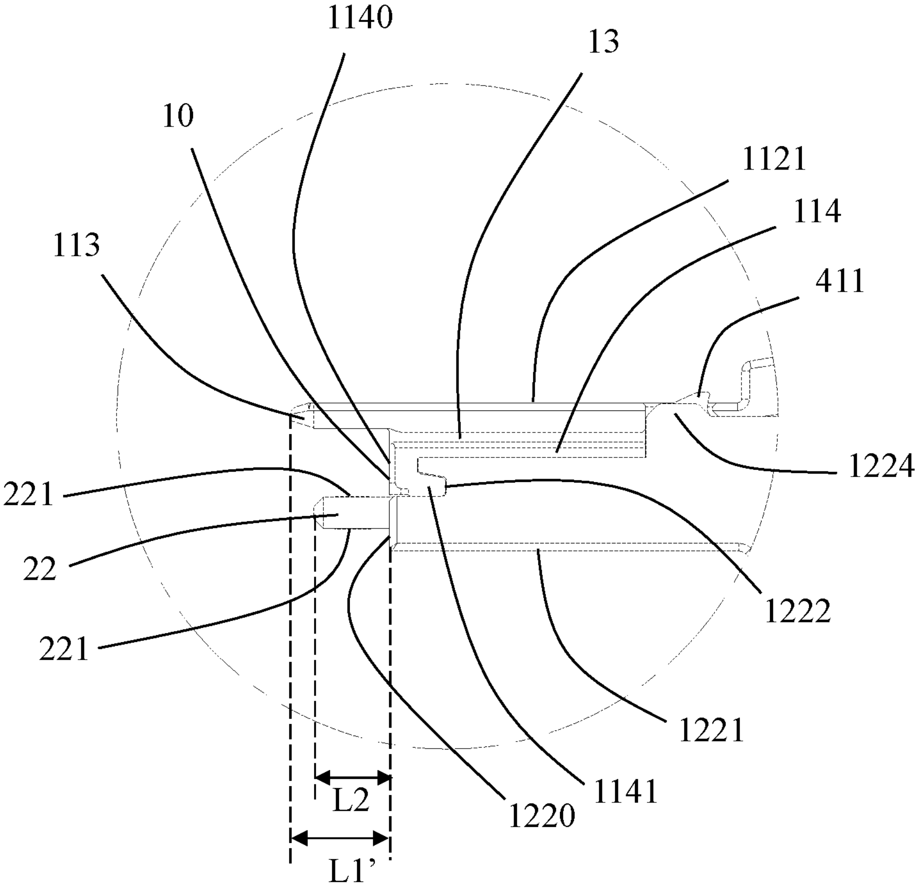
FIG. 17 is a partial enlarged view of the circled portion in FIG. 6 in another embodiment of the present disclosure.
Figure 18:
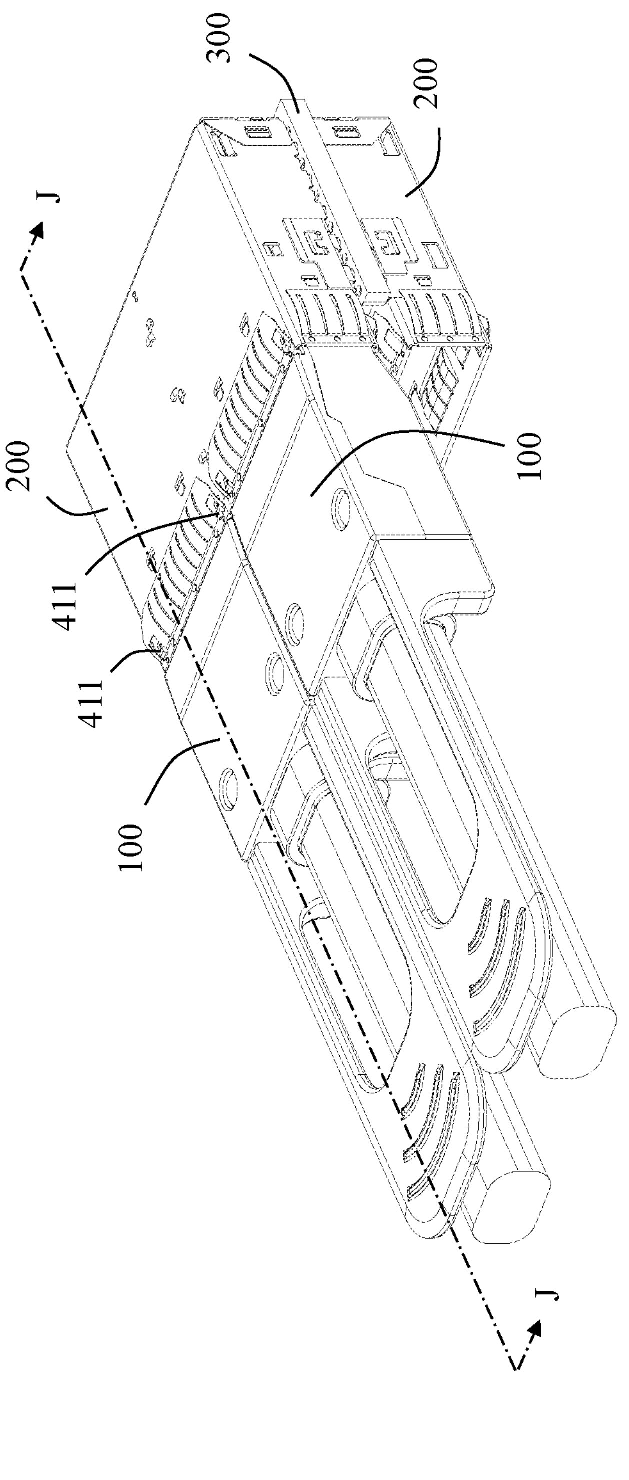
FIG. 18 is a schematic perspective view of a connector assembly in accordance with an embodiment of the present disclosure, wherein two plug connectors are inserted into a receptacle connector assembly.
Figure 19:
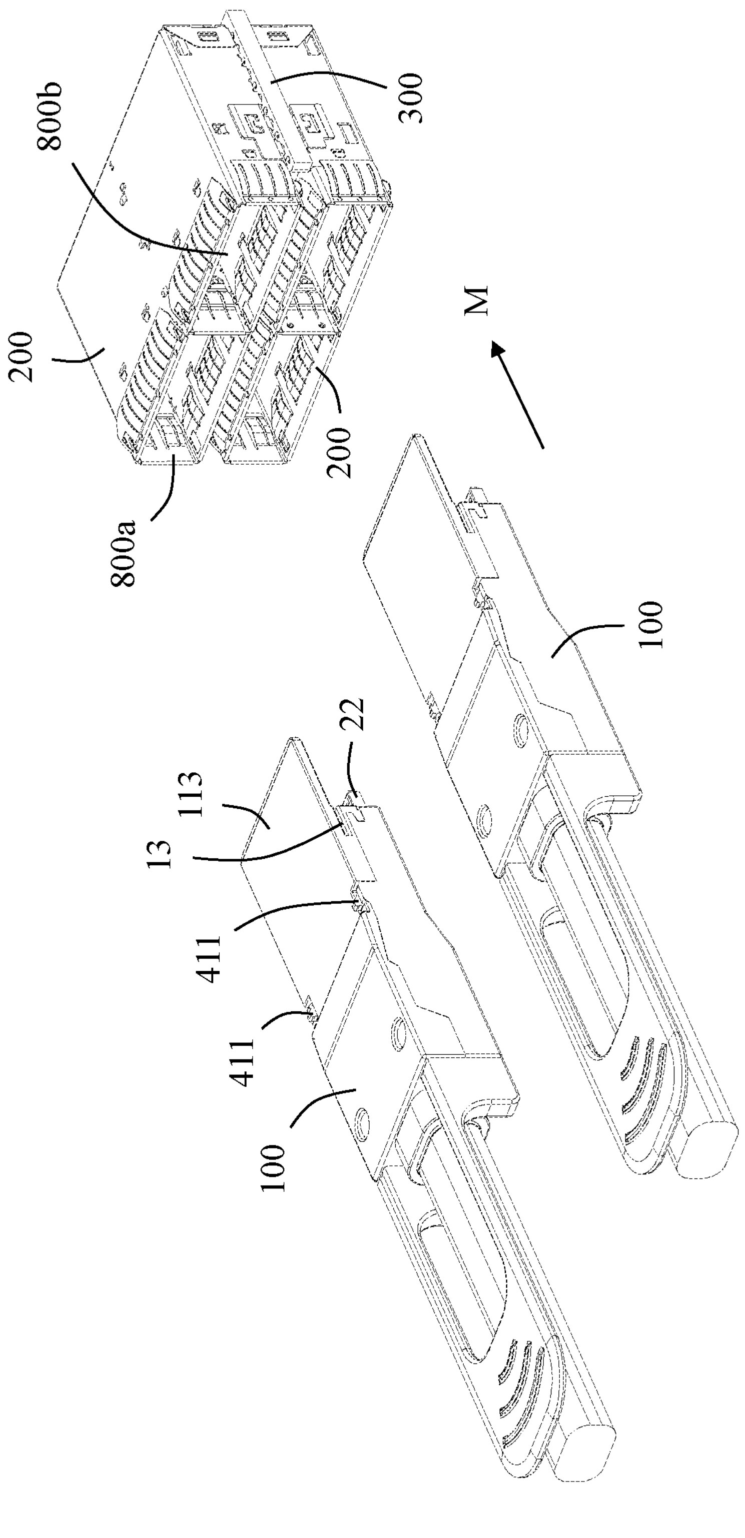
FIG. 19 is an exploded perspective view of FIG. 18.

As shown in FIGS. 3 and 6, both the tongue plate 22 and the extension plate 113 protrude beyond the mating surface 10 along the mating direction M. The extension plate 113 further protrudes beyond the tongue plate 22 along the mating direction M. In the illustrated embodiment of the present disclosure, only one extension plate 113 is provided on one side of the tongue plate 22 along the thickness direction T-T of the plug connector 100. In other words, an extension plate 113 is provided on one side of the tongue plate 22 along the thickness direction T-T of the plug connector 100. However, on an opposite side of the tongue plate 22 opposite to the extension plate 113, there is no structure protruding beyond the mating surface 10 along the mating direction M. In the illustrated embodiment of the present disclosure, a length of the extension plate 113 protruding beyond the mating surface 10 along the mating direction M is L1, a length of the tongue plate 22 protruding beyond the mating surface along the mating direction M is L2, where L1≥2*L2. With this arrangement, by appropriately increasing the length of the extension plate 113, when the plug connector 100 is inserted into the receptacle connector assembly 200, the extension plate 113 will contact the receptacle connector assembly 200 as early as possible to achieve pre-positioning. This is also beneficial to protect the tongue plate 22 and avoid possible damage to the tongue plate 22 due to incorrect insertion angles or mismatched receptacle connectors. In addition, this design is also beneficial to increase the insertion depth of the plug connector 100 and improve the mating reliability of the plug connector 100 with the receptacle connector 201 when the plug connector 100 is inserted in place. Referring to FIG. 17, in another embodiment of the plug connector 100 of the present disclosure, a length of the extension plate 113 protruding beyond the mating surface 10 along the mating direction M is L1', a length of the tongue plate 22 protruding beyond the mating surface along the mating direction M is L2, where L1'>L2. Compared to the embodiment in FIG. 6, the length L1' of the plug connector 100 in FIG. 17 is slightly greater than the length L2. Even so, by protruding the extension plate 113 out of the tongue plate 22 in the mating direction M, the extension plate 113 can still provide protection to the tongue plate 22 when the plug connector 100 is inserted into the receptacle connector assembly 200. It prevents the tongue plate 22 from firstly touching components of the receptacle connector assembly 200, thereby reducing the risk of damage to the tongue plate 22. In an embodiment of the present disclosure, a value range of L1 is 12.0 mm to 13.0 mm, and a value range of L2 is 3.8 mm to 3.9 mm. In an embodiment of the present disclosure, a width of the extension plate 113 along the width direction W-W of the plug connector 100 ranges from 20.0 mm to 21.0 mm. A width of the tongue plate 22 along the width direction W-W ranges from 18.0 mm to 19.0 mm. The width of the extension plate 113 is slightly larger than the width of the tongue plate 22, so that the extension plate 113 can protect the tongue plate 22 to a certain extent.

The slot 13 is provided on the first extension portion 112; or the slot 13 is provided on the second extension portion 122; or the slot 13 is formed between the first extension portion 112 and the second extension portion 122 in the thickness direction T-T of the plug connector 100. In the illustrated embodiment of the present disclosure, the slot 13 is provided on the convex portion 114. The slot 13 extends backwardly to communicate with the corresponding opening 1122. A distance between the slot 13 and the first surface 1121 in the thickness direction T-T is smaller than a distance between the slot 13 and the second surface 1221. In other words, the slot 13 is arranged on an upper side.

Referring to FIGS. 9 to 16, the locking mechanism 4 includes two locking arms 41 installed on two inner and opposite sides of the second housing 12, a driving member 42 mated with the locking arms 41, and two return springs 43 mated with the locking arms 41, respectively.

Each locking arm 41 includes a locking latch 411 located at a front end of the locking arm 41, an abutting portion 412 located at a rear end of the locking arm 41, and a pivot portion 413 located between the locking latch 411 and the abutting portion 412. The locking arm 41 is rotatable around the pivot portion 413. The slot 13 extends backwardly to be adjacent to the locking latch 411. This arrangement increases a length of each slot 13 along the mating direction M and is beneficial to increase an insertion depth of the plug connector 100, thereby improving the insertion reliability of the plug connector 100.

Figure 27:
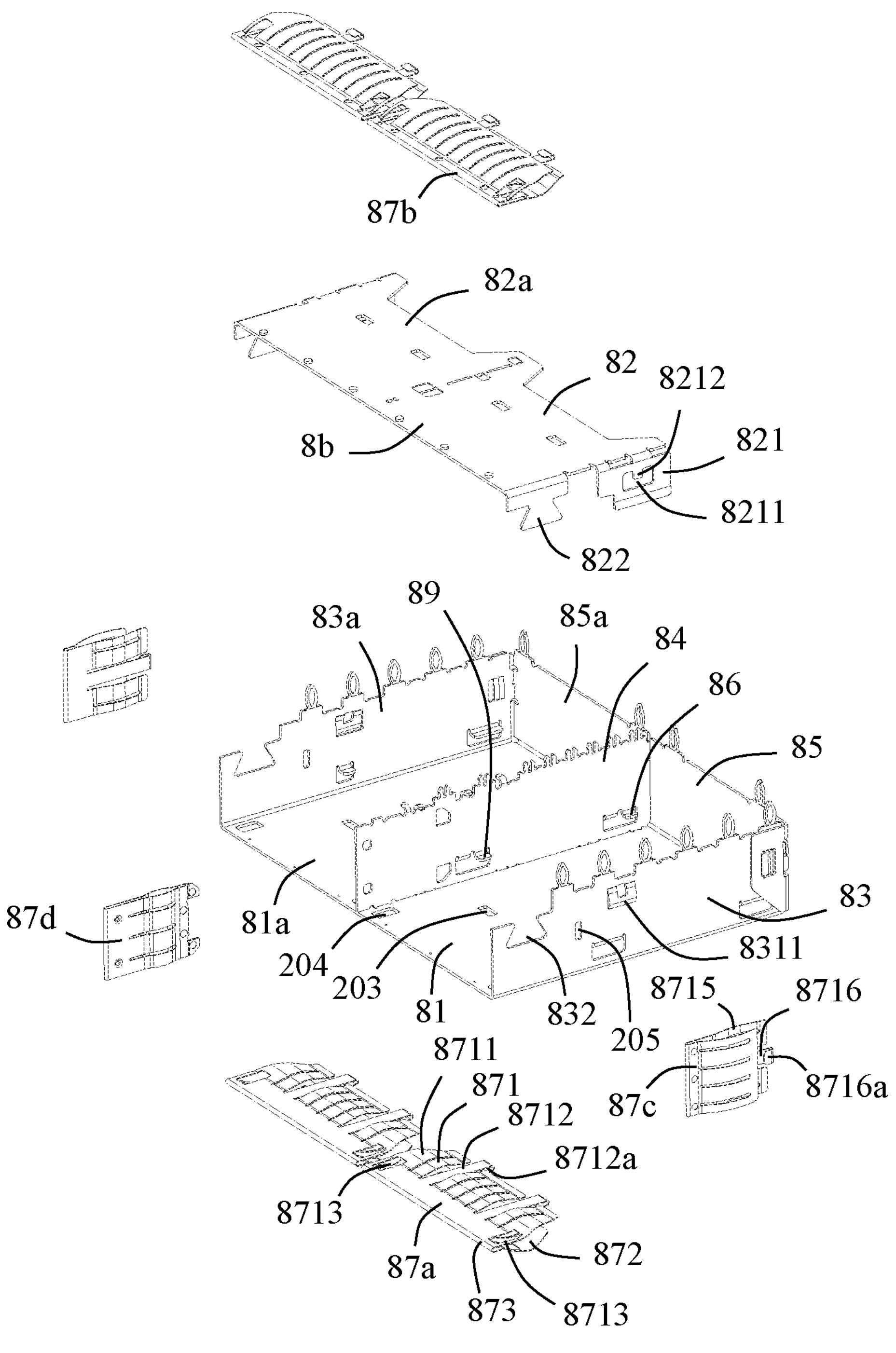
FIG. 27 is a further partial perspective exploded view of FIG. 26.
Figure 28:
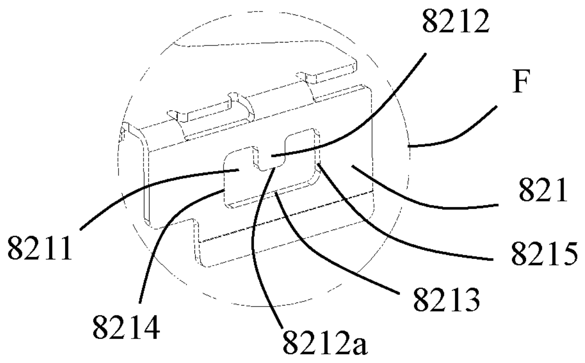
FIG. 28 is a partial enlarged view of a circled portion F in FIG. 26.
Figure 29:
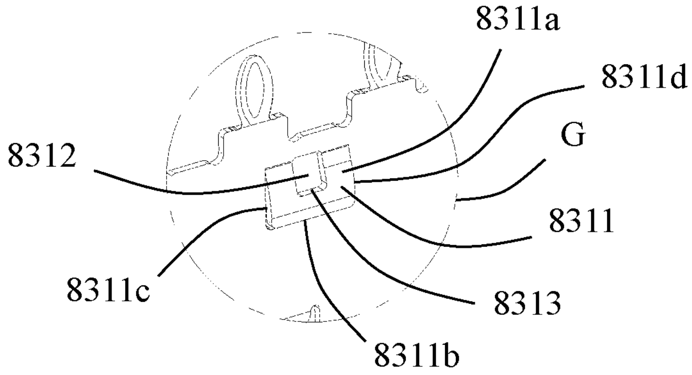
FIG. 29 is a partial enlarged view of a circled part G in FIG. 26.
Figure 30:
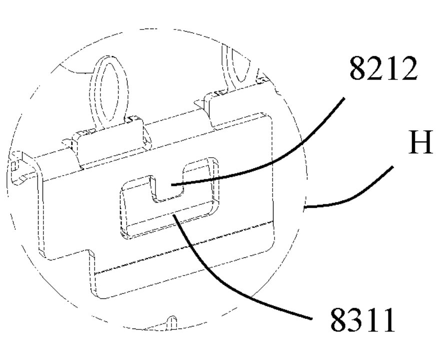
FIG. 30 is a partial enlarged view of a circled portion H in FIG. 25.
Figure 31:
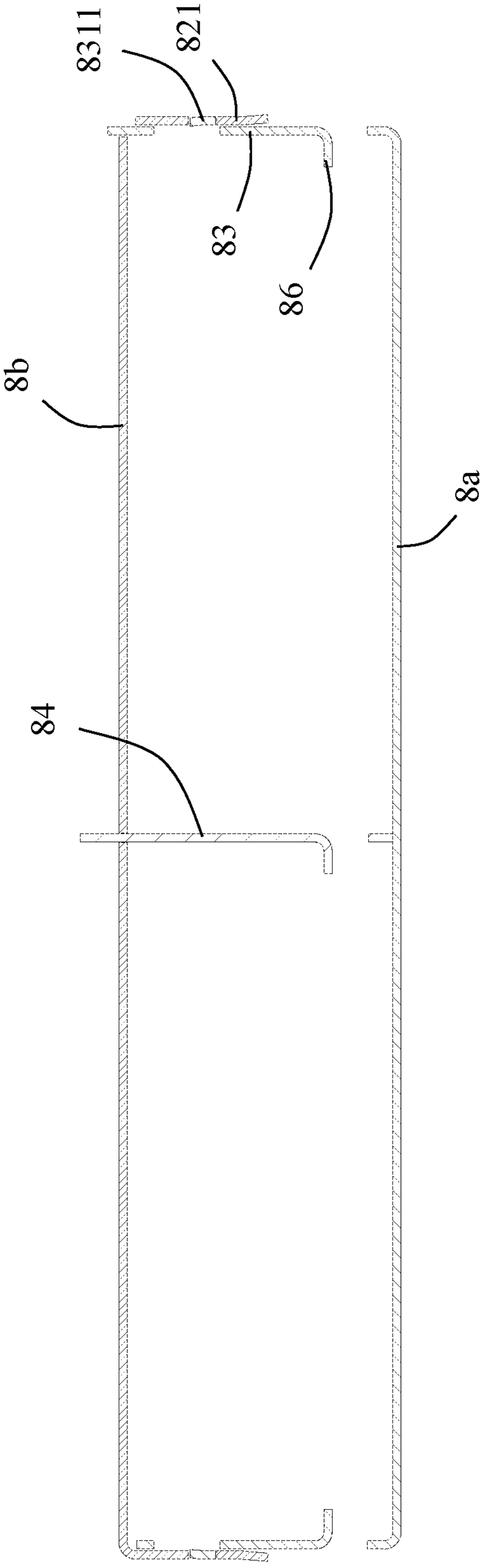
FIG. 31 is a schematic cross-sectional view taken along line I-I in FIG. 25.
Figure 32:
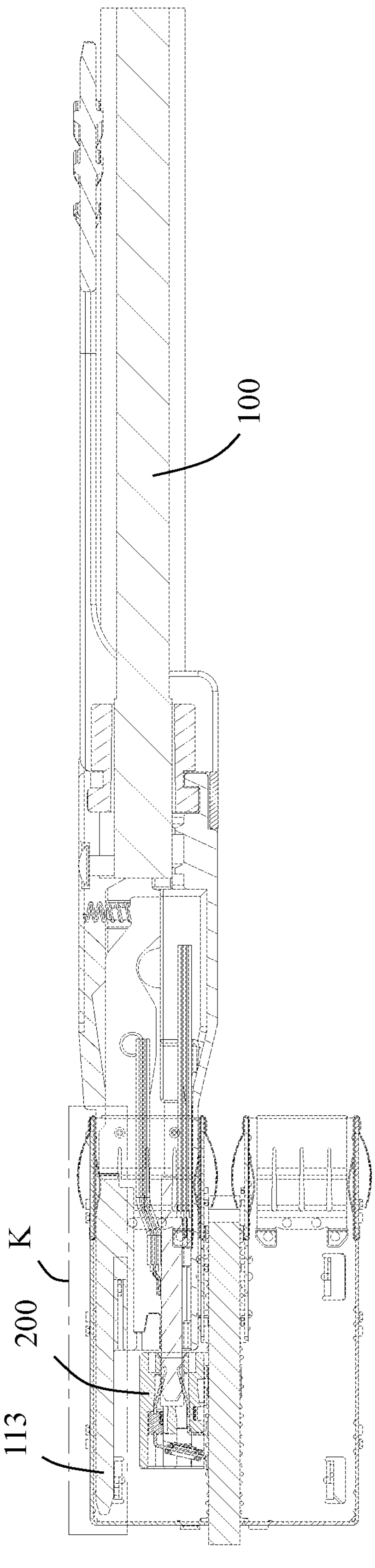
FIG. 32 is a schematic cross-sectional view taken along line J-J in FIG. 18.
Figure 33:
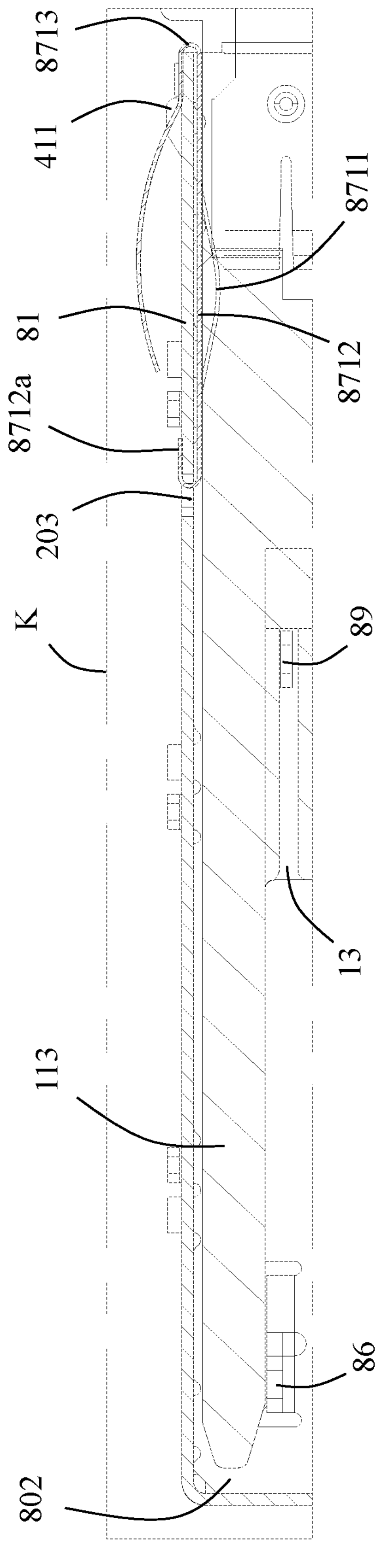
FIG. 33 is a partial enlarged view of a frame portion K in FIG. 32.

In the illustrated embodiment of the present disclosure, the return spring 43 is a compression spring. One end of the compression spring abuts against the top of the locking arm 41; and another end of the compression spring abuts against a lower surface of the first extension portion 112. A contact position of the locking latch 411 and the locking arm 41, and a contact position of the return spring 43 and the locking arm 41 are located on two sides of the pivot portion 413, respectively. With this arrangement, the locking arm 41 is equivalent to a seesaw of which a fulcrum is the pivot portion 413. When no external force is applied, under the action of the compression spring, the locking latch 411 is located in the corresponding opening 1122 and protrudes upwardly beyond the first surface 1121. Under this condition, the locking latch 411 can be matched with a corresponding locking structure (e.g., a locking slot 204, as shown in FIG. 27) of the receptacle connector 201, that is, this state is a locking state when the plug connector 100 is inserted into the receptacle connector.

Figure 5:
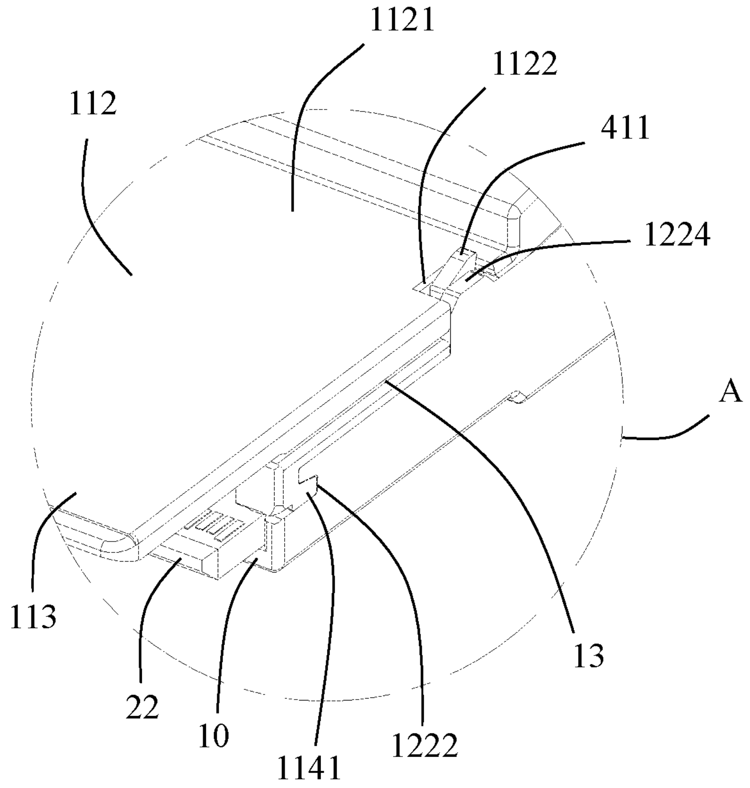
FIG. 5 is a partial enlarged view of a circled part A in FIG. 1.

As shown in FIG. 5, each limiting protrusion 1224 is located outside the corresponding locking latch 411 along the width direction W-W of the plug connector 100 so as to limit the locking latch 411.

In the illustrated embodiment of the present disclosure, in order to better fix the compression spring, each locking arm 41 further includes a mounting post 414. One end of the compression spring is sleeved on the mounting post 414 to prevent the compression spring from leaving its original position after being stressed.

In the illustrated embodiment of the present disclosure, the pivot portion 413 includes a pivot hole. The first housing 11 includes a pivot shaft 116 that matches with the pivot hole. The pivot shaft 116 is integrally formed on the first housing 11. The locking arm 41 is rotatable around the pivot shaft 116 under the action of the external force. Of course, in other embodiments, the pivot shaft 116 may also be integrally formed on the second housing 12; or the pivot shaft 116 is a separate shaft assembled to the first housing 11 and/or the second housing 12.

Of course, in other embodiments, the return spring 43 may also be a tension spring. One end of the tension spring is fixed to the locking arm 41, and the other end of the tension spring is fixed to the housing 1.

In addition, each locking arm 41 further includes a first recess 415 located between the abutting portion 412 and the pivot portion 413, and an inner abutting surface **412*a* exposed in the first recess 415. In the illustrated embodiment of the present disclosure, the first recess 415 is located below the mounting post 414 and is aligned with the mounting post 414 in the vertical direction. The inner abutting surface 412*a* is provided on the abutting portion 412. In the illustrated embodiment of the present disclosure, the inner abutting surface 412*a*** is an inclined surface.

Figure 15:
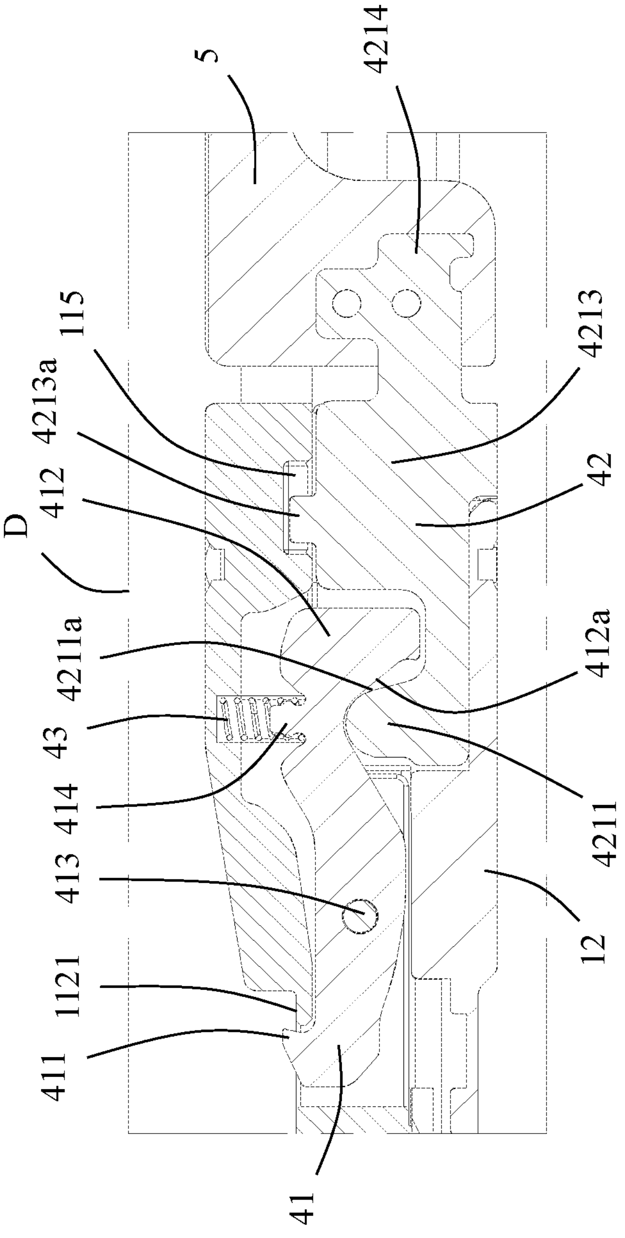
FIG. 15 is a partial enlarged view of a frame part D in FIG. 13.
Figure 16:
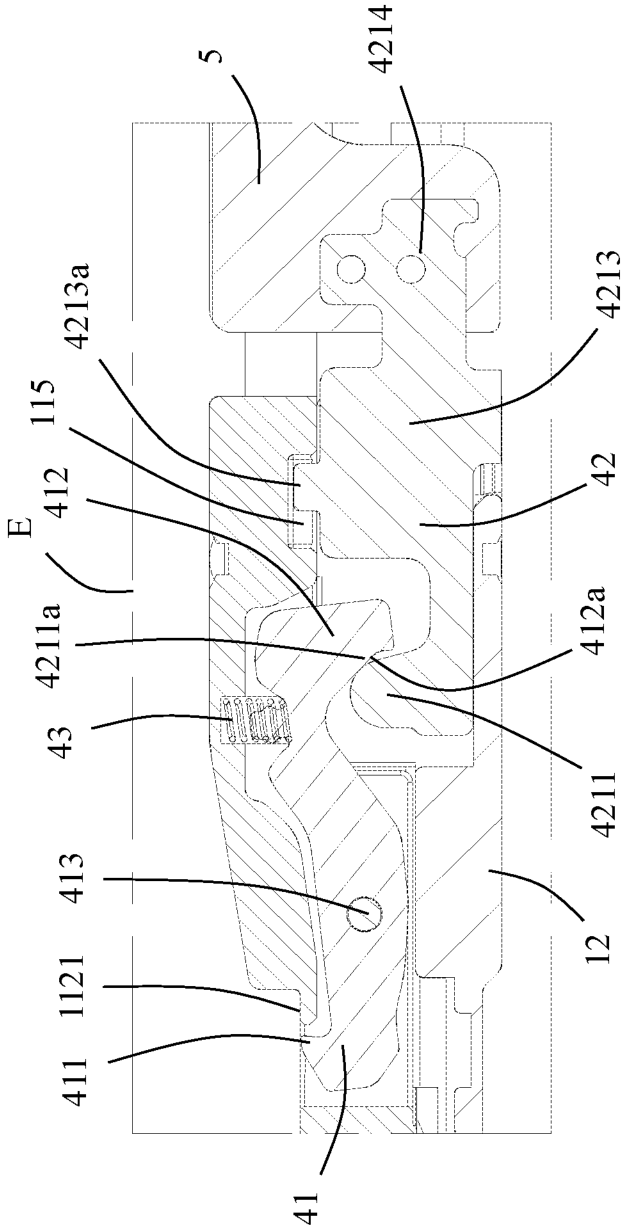
FIG. 16 is a partial enlarged view of a frame part E in FIG. 14.

The driving member 42 is connected to the pull strap 5. The driving member 42 includes two driving arms 421 located on opposite sides and a connecting rod 422 which connects the two driving arms 421. Each driving arm 421 is located at a rear end of the corresponding locking arm 41 and abuts against the locking arm 41. Each driving arm 421 includes a protruding portion 4211 received in the first recess 415, a second recess 4212 for receiving the abutting portion 412, a base portion 4213 connected to the protruding portion 4211 and a fixing portion 4214 protruding backwardly from the base portion 4213. The protruding portion 4211 includes an outer abutting surface **4211*a* which abuts against the inner abutting surface 412*a*. In the illustrated embodiment of the present disclosure, the outer abutting surface 4211*a* is a curved surface. Through the cooperation of the curved surface and the inclined surface, the smoothness of the interaction between the driving arm 421 and the locking arm 41 is improved. As shown in FIGS. 15 and 16, the base portion 4213 is provided with a protrusion 4213*a* extending upwardly. The first housing 11 includes a limiting slot 115. The protrusion 4213*a* is movable in the limiting slot 115 under the action of external force. In the illustrated embodiment of the present disclosure, the fixing portion 4214 is insert-molded in the pull strap 5. The connecting rod 422 connects the base portions 4213 of the two driving arms 421 to strengthen the structure of the driving member 42, improve the stability of the driving member 42 when moving, and improve the synchronization of the movement of the two locking arms 41**.

As shown in FIG. 9, the pull strap 5 includes a first connecting portion 51 and a second connecting portion 52 which are respectively connected to the fixing portions 4214 of the two locking arms 41. The first connecting portion 51 and the second connecting portion 52 respectively extend in a vertical direction and are parallel to each other. In the illustrated embodiment of the present disclosure, the first connecting portion 51 and the second connecting portion 52 are both L-shaped. The pull strap 5 further includes a bridge portion 53 connecting the first connecting portion 51 and the second connecting portion 52. The bridge portion 53 extends in a horizontal direction.

The pull strap 5 is movable in a direction opposite to the mating direction M under the pulling of the external force, so as to directly or indirectly drive the locking latches 411 to move away from the first surface 1121 in the thickness direction T-T. Specifically, referring to FIGS. 14 and 16, in the illustrated embodiment of the present disclosure, when the pull strap 5 moves in the direction opposite to the mating direction M under the pulling of the external force, each outer abutting surface **4211*a* of the protruding portion 4211 abuts against the inner abutting surface 412*a* of the abutting portion 412, and slides on the inner abutting surface 412*a*. Under this condition, an upward force is generated to move the abutting portions 412 upwardly and compress the compression springs. At the same time, the locking latches 411 move downwardly to move away from the first surface 1121. This state is an unlocked state of the plug connector 100**.

When the external force is removed, the return springs 43 release elastic force, so that the abutting portions 412 move downwardly. At the same time, the locking latches 411 move upwardly, and the locking arms 41 return to their original positions.

In the present disclosure, the two return springs 43 are provided to make the force of the locking arms 41 more even, which improves the stability of the movement of the locking arms 41.

Referring to FIGS. 18 to 26, the present disclosure also discloses a connector assembly which includes a circuit board 300, a plurality of receptacle connector assemblies 200 mounted on the circuit board 300, and the plug connectors 100 for mating with the receptacle connector assemblies 200.

In the illustrated embodiment of the present disclosure, two receptacle connector assemblies 200 are provided and installed on opposite sides (e.g., upper and lower sides) of the circuit board 300 in a belly-to-belly manner. This arrangement is beneficial to more effectively utilize the space of the circuit board 300 and improve the installation efficiency.

Each receptacle connector assembly 200 includes a plurality of receptacle connectors 201 and a metal cage 202 which shields the receptacle connectors 201. In an embodiment shown in the present disclosure, two receptacle connectors 201 with the same structure are provided. The following only takes one of the receptacle connectors 201 as an example for detailed description.

Figure 20:
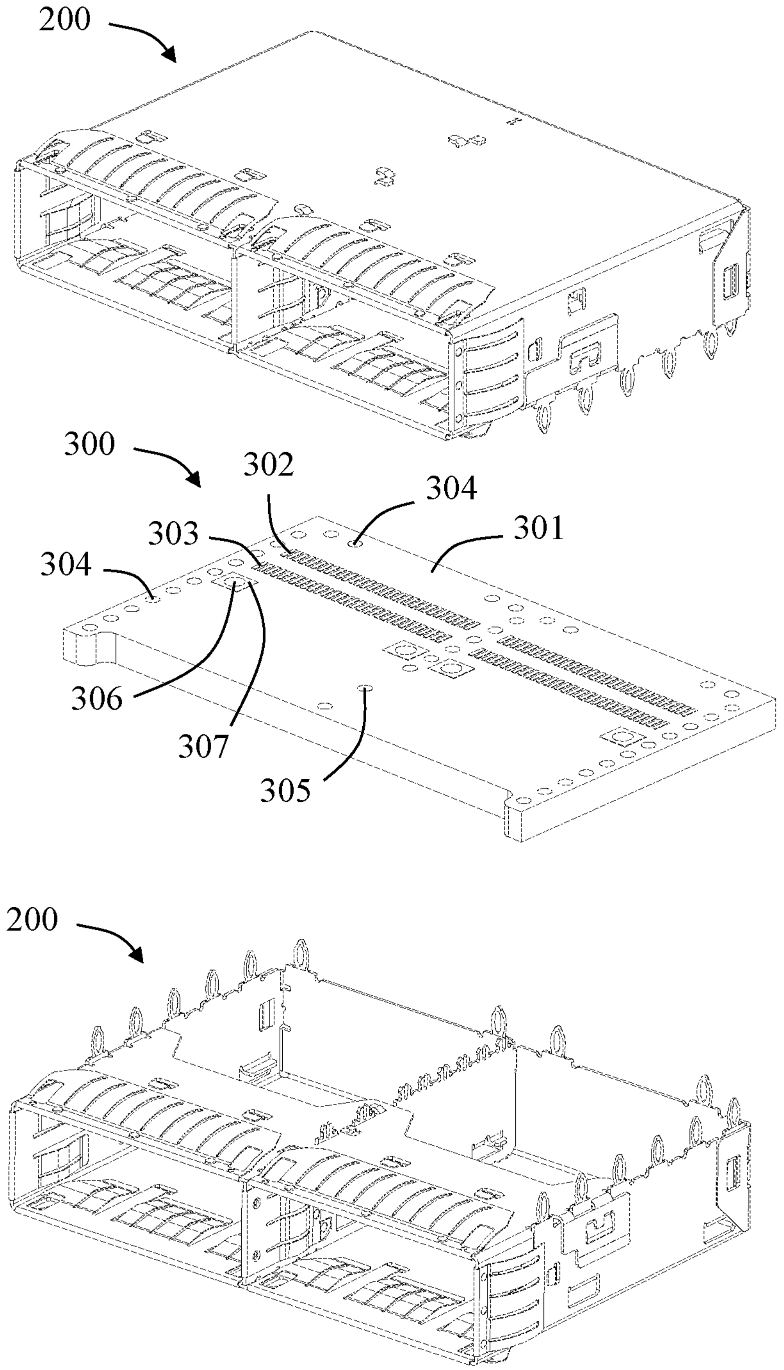
FIG. 20 is a perspective view of the present disclosure when the two receptacle connector assemblies are separated from a circuit board.
Figure 21:
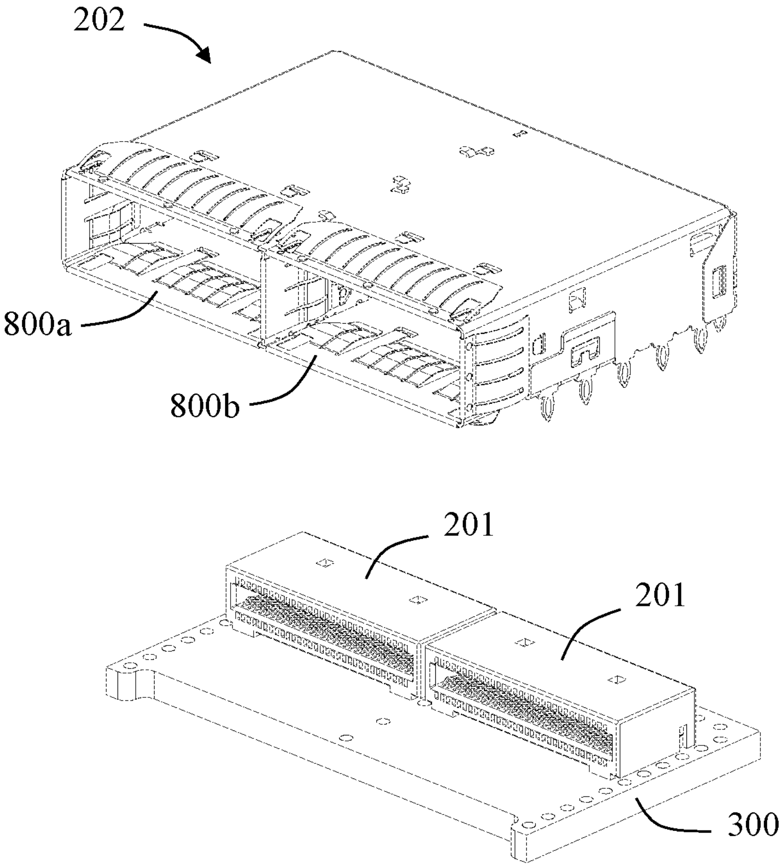
FIG. 21 is a schematic perspective view of the receptacle connector of the present disclosure when the receptacle connector is mounted on the circuit board, and the metal cage is separated from the receptacle connector.

Referring to FIG. 20, corresponding to one receptacle connector 201, the circuit board 300 includes a first surface 301 (e.g., an upper surface), a plurality of first soldering pads 302 on the first surface 301, a plurality of second soldering pads 303 on the first surface 301, a plurality of conductive holes 304 extending through the first surface 301, a plurality of mounting holes 305 extending through the first surface 301, a plurality of positioning through holes 306 extending through the first surface 301, and a plurality of ground soldering pads 307 surrounding the positioning through holes 306. In the embodiment shown in the present disclosure, the plurality of first soldering pads 302 are arranged in a first row, the plurality of second soldering pads 303 are arranged in a second row, and the first row is parallel to the second row. The positioning through holes 306 are located at the front end of the second soldering pads 303. The conductive holes 304 are located on the left and rear sides of the first soldering pads 302 and the second soldering pads 303. The mounting holes 305 are located on the right side of the first soldering pads 302 and the second soldering pads 303.

The receptacle connector 201 includes an insulating body 6 and a plurality of terminal modules 7 mounted to the insulating body 6. The insulating body 6 includes an insertion surface 61, an insertion slot 62 extending through the insertion surface 61, an installation space 63 communicating with the insertion slot 62, a top wall 64 located at the top of the insertion slot 62, and a bottom wall 65 located at the bottom of the insertion slot 62. The insertion slot 62 is formed between the top wall 64 and the bottom wall 65 in a top-to-bottom direction. The top wall 64 is provided with a plurality of lock holes 641 communicating with the insertion slot 62. The bottom wall 65 is provided with a plurality of positioning cylinders 651 protruding downwardly. The receptacle connector 201 further includes a plurality of metal grounding pieces 652 fixed on the bottom wall 65 and sleeved on the positioning cylinders 651. The positioning cylinders 651 are adapted for being inserted into the positioning through holes 306 of the circuit board 300. The metal grounding pieces 652 are adapted for being soldered and fixed with the ground soldering pads 307 of the circuit board 300.

Figure 22:
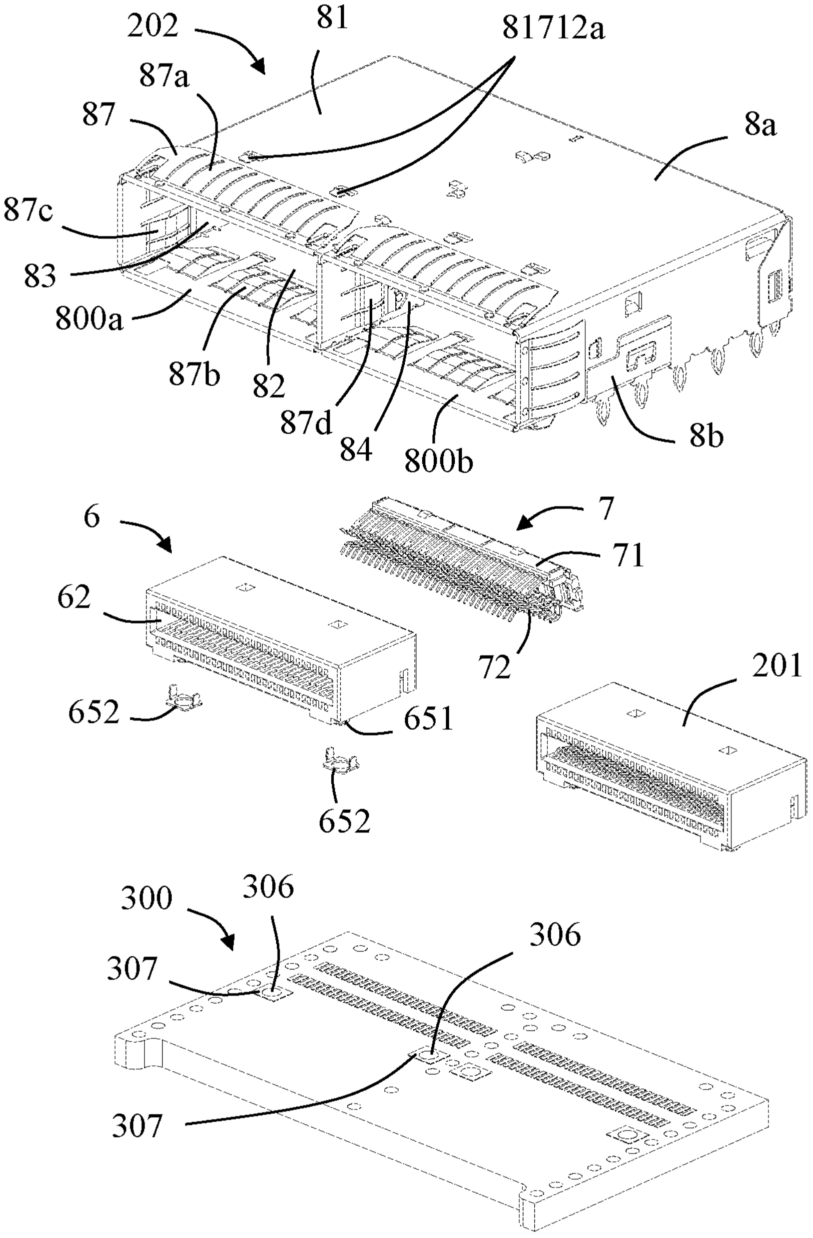
FIG. 22 is a further partial perspective exploded view of FIG. 21.
Figure 23:
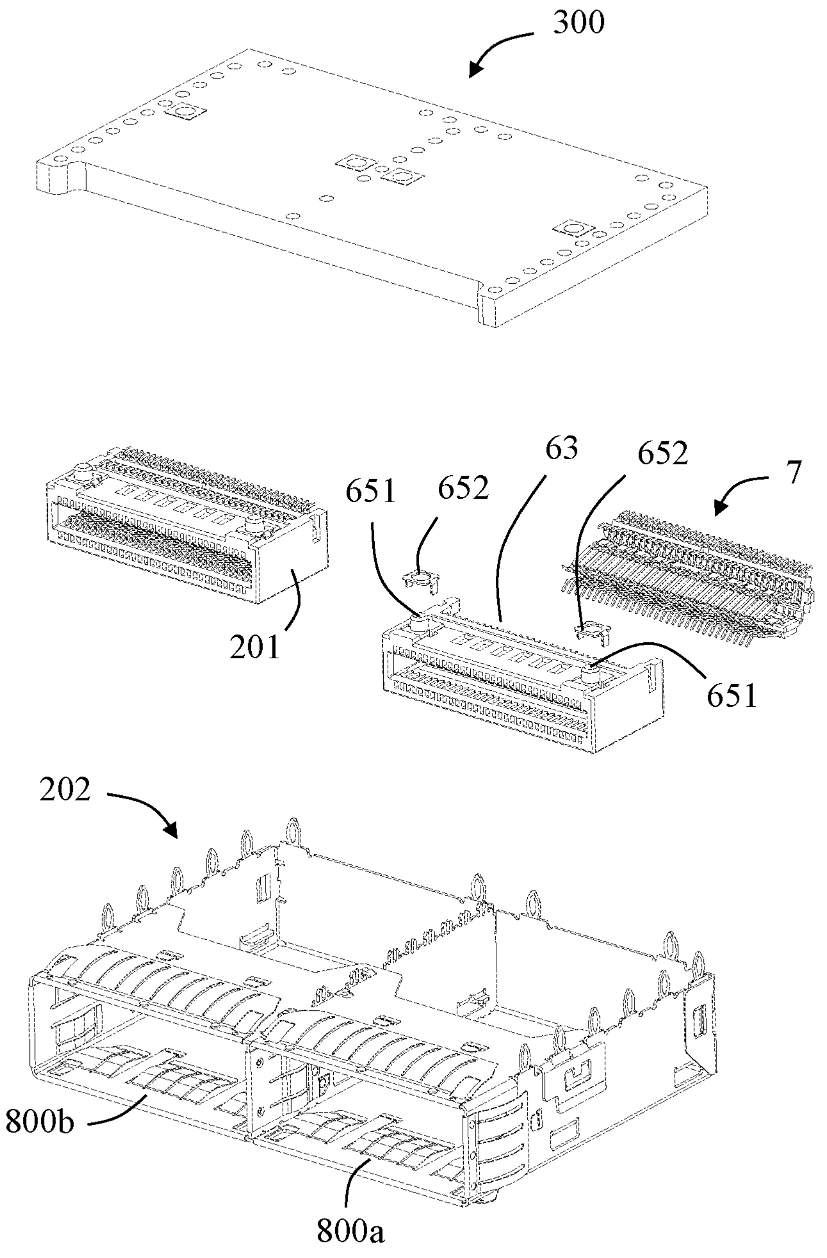
FIG. 23 is a partially exploded perspective view of FIG. 22 from another angle.
Figure 24:
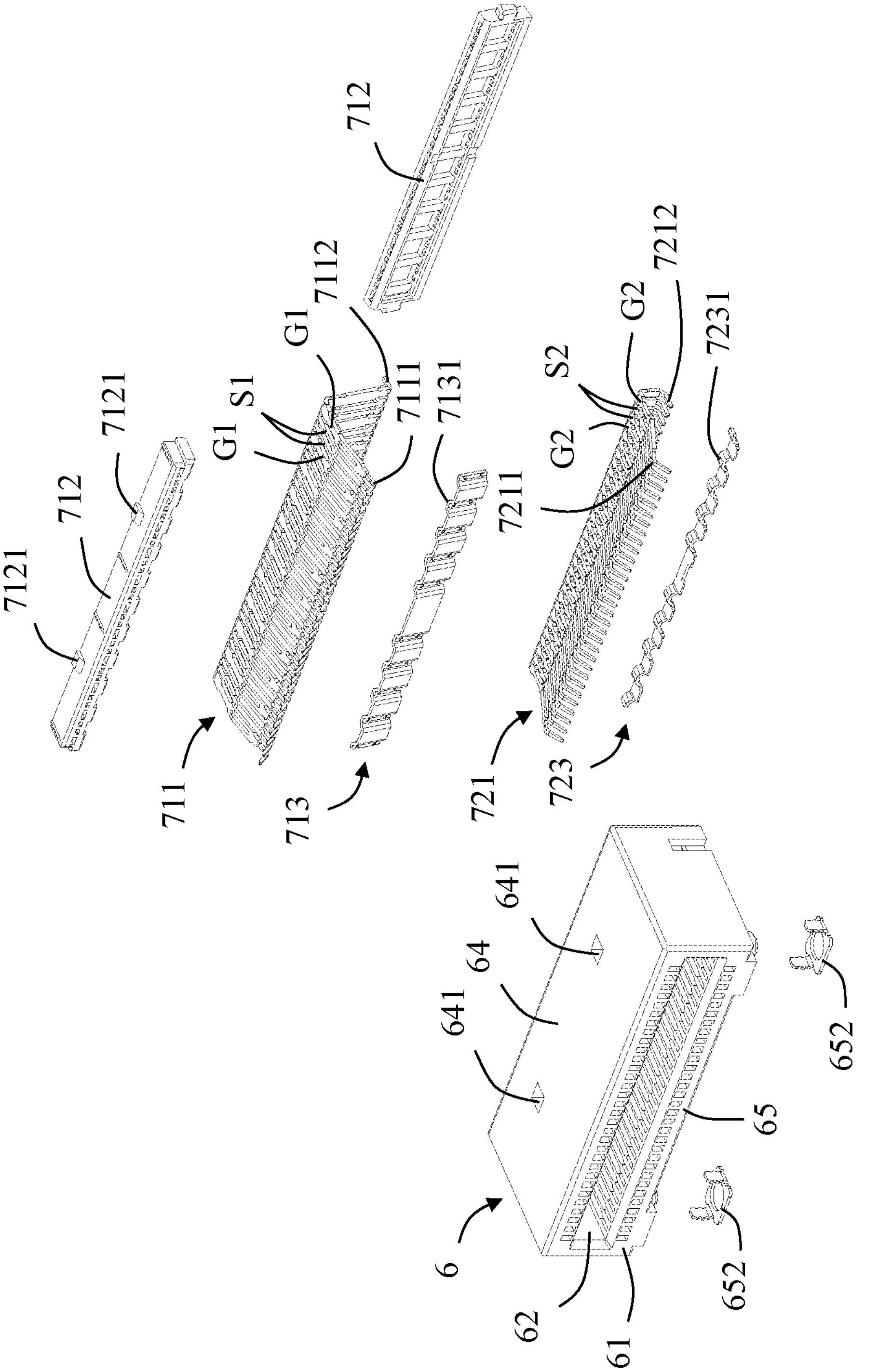
FIG. 24 is a further exploded perspective view of the receptacle connector in FIG. 22.

Referring to FIGS. 22 to 24, the terminal module 7 includes a first terminal module 71 and a second terminal module 72. During assembling, the first terminal module 71 and the second terminal module 72 are assembled into the insulating body 6 from the installation space 63. The first terminal module 71 includes a plurality of first conductive terminals 711, at least one first insulating block 712 and a first ground connection piece 713. The first insulating block 712 is provided with a plurality of lock protrusions 7121 which are locked in the lock holes 641 of the insulating body 6. In the embodiment shown in the present disclosure, the plurality of first conductive terminals 711 are insert-molded with the first insulating block 712. The plurality of first conductive terminals 711 include a plurality of first signal terminals S1 and a plurality of first ground terminals G1. Each two adjacent first signal terminals S1 forms a first differential pair. Each side of the first differential pair is provided with one first ground terminal G1 to improve the quality of signal transmission. The first ground connection piece 713 includes a plurality of first protrusions 7131 arranged at intervals. The plurality of first protrusions 7131 are in contact with corresponding first ground terminals G1 to connect all the first ground terminals G1 in series so as to improve the shielding effect. Each of the first conductive terminals 711 includes a first elastic mating portion 7111 protruding into the insertion slot 62 and a first soldering portion 7112 for being soldered and fixed with the first soldering pads 302 of the circuit board 300.

The second terminal module 72 includes a plurality of second conductive terminals 721 and a second ground connection piece 723. In the embodiment shown in the present disclosure, the plurality of second conductive terminals 721 are directly assembled to the insulating body 6. The plurality of second conductive terminals 721 include a plurality of second signal terminals S2 and a plurality of second ground terminals G2. Each adjacent two second signal terminals S2 forms a second differential pair. Each side of the second differential pair is provided with one second ground terminal G2 to improve quality of signal transmission. The second ground connection piece 723 includes a plurality of second protrusions 7231 arranged at intervals. The plurality of second protrusions 7231 are in contact with corresponding second ground terminals G2 to connect all the second ground terminals G2 in series so as to improve the shielding effect. Each of the second conductive terminals 721 includes a second elastic mating portion 7211 protruding into the insertion slot 62 and a second soldering portion 7212 for being soldered and fixed with the second soldering pads 303 of the circuit board 300. The first elastic mating portions 7111 and the second elastic mating portions 7211 are respectively located on two sides (e.g., upper and lower sides) of the insertion slot 62 and face to face. The insertion slot 62 is adapted for receiving the tongue plate 22 of the plug connector 100. The first elastic mating portions 7111 are adapted for contacting the conductive pads 221 located on one side surface (e.g., an upper surface) of the tongue plate 22. The second elastic mating portions 7211 are adapted for contacting the conductive pads 221 located on the other side surface (e.g., a lower surface) of the tongue plate 22.

The metal cage 202 includes a first insertion space 800*a* and a first opening 801 located at the rear end of the first insertion space 800*a* along the mating direction M. The receptacle connector 200 is accommodated in the metal cage 202 from the first opening 801. The insertion slot 62 communicates with the first insertion space 800*a*.

The metal cage 202 includes a first wall portion 81 (e.g., a top wall), a second wall portion 82 (e.g., a bottom wall) opposite to the first wall portion 81, a third wall portion 83 (e.g., a right side wall) connected to the first wall portion 81, a fourth wall portion 84 (e.g., a left side wall) opposite to the third wall portion 83, and a fifth wall portion 85 (e.g., a rear wall) located at the rear end of the first insertion space 800*a*. The first wall portion 81, the second wall portion 82, the third wall portion 83 and the fourth wall portion 84 are enclosed a first frame. The first insertion space 800*a* extends through the first frame along a direction opposite to the mating direction M. In the illustrated embodiment of the present disclosure, the third wall portion 83 and the fifth wall portion 85 are provided with pressing pins 831, 851 which are press-fitted into the conductive holes 304 of the circuit board 300. The pressing pins 831, 851 are respectively provided with fish-eye holes 8311, 8511, so that the pressing pins 831, 851 have a certain elastic deformation ability, thereby facilitating the realization of pressing the pressing pins 831, 851 into the conductive holes 304 and maintaining reliable contact with the conductive holes 304. The fourth wall portion 84 is provided with a plurality of hook pins 84. The hook pins 841 are adapted for being locked in the mounting holes 305 of the circuit board 300 to increase the holding force.

In the illustrated embodiment of the present disclosure, two receptacle connectors 200 are provided and arranged side by side. The metal cage 202 includes a second insertion space 800*b* arranged side by side with the first insertion space 800*a*. The metal cage 202 includes a sixth wall portion 81*a* (e.g., a top wall), a seventh wall portion 82*a* (e.g., a bottom wall) opposite to the sixth wall portion 81*a*, an eighth wall portion 83*a* (e.g., a left side wall) connected to the sixth wall portion 81*a*, the fourth wall portion 84 (e.g., the right side wall) opposite to the eighth wall portion 83*a*, and a ninth wall portion 85*a* (e.g., a rear wall) located at the rear end of the second insertion space 800*b*. The sixth wall portion 81*a*, the seventh wall portion 82*a*, the eighth wall portion 83*a*, and the fourth wall portion 84 are enclosed to form a second frame. The second insertion space 800*b* extends through the second frame in the direction opposite to the mating direction M. In the embodiment shown in the present disclosure, the first wall portion 81 and the sixth wall portion 81*a* are integrally connected and serve as a top wall of the metal cage 202. The second wall portion 82 is integrally connected with the seventh wall portion 82*a* and serves as a bottom wall of the metal cage 202. The third wall portion 83 and the eighth wall portion 83*a* are formed by bending downwardly from opposite sides of the top wall of the metal cage 202, respectively. The fifth wall portion 85 is integrally connected with the ninth wall portion 85*a* and serves as a rear wall of the metal cage 202. The first insertion space 800*a* and the second insertion space 800*b* are separated by the fourth wall portion 84. In other words, the fourth wall portion 84 is equivalent to a partition wall to divide the metal cage 202 into the first insertion space 800*a* and the second insertion space 800*b* which are located adjacent to each other.

Specifically, the metal cage 202 includes a first metal shell 8*a* and a second metal shell 8*b* assembled and fixed with the first metal shell 8*a*. The first metal shell 8*a* includes the first wall portion 81, the sixth wall portion 81*a*, the third wall portion 83, and the eighth wall portion 83*a*. The second metal shell 8*b* includes the second wall portion 82 and the seventh wall portion 82*a*. Since the structures forming the first insertion space 800*a* and the second insertion space 800*b* are similar, only the first insertion space 800*a* is taken as an example for detailed description below.

Referring to FIGS. 25 to 33, in the illustrated embodiment of the present disclosure, the second wall portion 82 includes a retaining portion 821 and a dovetail protrusion 822 located at the front end of the retaining portion 821. The retaining portion 821 includes a first locking hole 8211, a first buckle tab 8212 protruding into the first locking hole 8211 along an assembling direction (e.g., a bottom-to-top direction), and a first abutting surface 8213 opposite to the first buckle tab 8212. In the embodiment shown in the present disclosure, the retaining portion 821 is formed by bending the second wall portion 82.

The third wall portion 83 includes a first locking protrusion 8311 held in the first locking hole 8211 and a dovetail groove 832 for holding the dovetail protrusion 822. The first locking protrusion 8311 includes a first retaining groove 8312 mated with the first buckle tab 8212 and a first limiting surface 8313 exposed in the first retaining groove 8312. The first abutting surface 8213 cooperates with the first locking protrusion 8311 to restrict the second metal shell 8*b* from being separated from the first metal shell 8*a* in a direction opposite to the assembling direction. The first limiting surface 8313 cooperates with the first buckle tab 8212 to limit the excessive displacement of the second metal shell 8*b* relative to the first metal shell 8*a* along the assembling direction. It is understandable to those skilled in the art that the term "excessive displacement" used in the present disclosure includes but is not limited to the following scenarios:

First scenario: When the second metal shell 8*b* is assembled to the first metal shell 8*a* along the assembling direction, the first limiting surface 8313 cooperates with the first buckle tab 8212, the second metal shell 8*b* can be prevented from being over-assembled relative to the first metal shell 8*a* along the assembling direction.

Second scenario: When the second metal shell 8*b* has been assembled to the first metal shell 8*a* and is subjected to an external force, through the cooperation between the first limiting surface 8313 and the first buckle tab 8212, the second metal shell 8*b* can be prevented from further moving toward the first metal shell 8*a*.

In the embodiment shown in the present disclosure, the first locking protrusion 8311 includes a second abutting surface 8311*b* located at an end of the first locking protrusion 8311 along the assembling direction. The second abutting surface 8311*b* is configured to abut against the first abutting surface 8213 to prevent the first locking protrusion 8311 from disengaging from the first locking hole 8211 in the direction opposite to the assembling direction.

In the illustrated embodiment of the present disclosure, the first buckle tab 8212 includes a first pressing surface 8212*a* located at an end of the first buckle tab 8212 along the assembling direction. The first limiting surface 8313 is configured to press against the first pressing surface 8212*a*, so as to prevent the second metal shell 8*b* from being excessively displaced relative to the first metal shell 8*a* along the assembling direction.

In the embodiment shown in the present disclosure, the first locking protrusion 8311 includes a first locking surface 8311*c* and a second locking surface 8311*d* spaced along the front-rear direction. The retaining portion 821 includes a first matching surface 8214 and a second matching surface 8215 exposed in the first locking hole 8211 along the front-rear direction. The first mating surface 8214 is configured to abut against the first locking surface 8311*c* to prevent the first locking protrusion 8311 from moving forwardly. The second mating surface 8215 is configured to abut against the second locking surface 8311*d* to prevent the first locking protrusion 8311 from moving backwardly.

In the embodiment shown in the present disclosure, the first locking hole 8211 and the first retaining groove 8312 are surrounding types, so as not to significantly reduce the corresponding structural strength of the first metal shell 8*a* and the second metal shell 8*b*. In the embodiment shown in the present disclosure, the first locking protrusion 8311 is a stamping protrusion formed by stamping outward from the third wall portion 83. The first locking protrusion 8311 includes an inclined guide surface 8311*a*. The inclined guide surface 8311*a* is configured to guide the retaining portion 821 and abut against the retaining portion 821 when the second metal shell 8*b* is assembled to the first metal shell 8*a*. After the second metal shell 8*b* and the first metal shell 8*a* are assembled, the first locking protrusions 8311 are tightly held in first locking holes 8211 along the front-rear direction perpendicular to the assembling direction, so as to realize the position limit in the front-rear direction and prevent loosening of the first metal shell 8*a* and the second metal shell 8*b* in the front-rear direction.

The third wall portion 83 and/or the fourth wall portion 84 is provided with a first guide protrusion 89 which protrudes into the first insertion space 800*a*. The first guide protrusion 89 is configured to be inserted into the slot 13 of the plug connector 100. In the embodiment shown in the present disclosure, both the third wall portion 83 and the fourth wall portion 84 are provided with the first guide protrusions 89 which protrude into the first insertion space 800*a*. The first guide protrusion 89 of the third wall portion 83 and the first guide protrusion 89 of the fourth wall portion 84 are respectively inserted into the slots 13 located on two sides of the plug connector 100 in order to improve mating stability. In the illustrated embodiment of the present disclosure, the first guide protrusions 89 are punched from the third wall portion 83 and the fourth wall portion 84, respectively.

The receptacle connector assembly 200 includes a first chamber 802 between the first wall portion 81 and the insulating body 6. The third wall portion 83 and/or the fourth wall portion 84 is provided with a second guide protrusion 86 which protrudes into the first chamber 802. The first guide protrusion 89 is configured to guide the extension plate 113 of the plug connector 100. The second guide protrusion 86 is configured to support the extension plate 113 of the plug connector 100. In the embodiment shown in the present disclosure, the heights of the first guide protrusions 89 and the second guide protrusions 86 are different, but both extend in the horizontal direction. The first guide protrusions 89 and the second guide protrusions 86 are both perpendicular to the third wall portion 83 and the fourth wall portion 84. The first guide protrusion 89 and the second guide protrusion 86 are located on the front and rear sides of the receptacle connector 201, respectively.

When the plug connector 100 is inserted into the receptacle connector assembly 200, the first guide protrusion 89 supports and guides the extension plate 113. When the plug connector 100 is inserted into place, the tongue plate 22 is inserted into the insertion slot 62, the first elastic mating portions 7111 and the second elastic mating portions 7211 abut against the conductive pads 221, and the first guide protrusion 89 is inserted into the slot 13 to improve mating stability.

Figure 25:
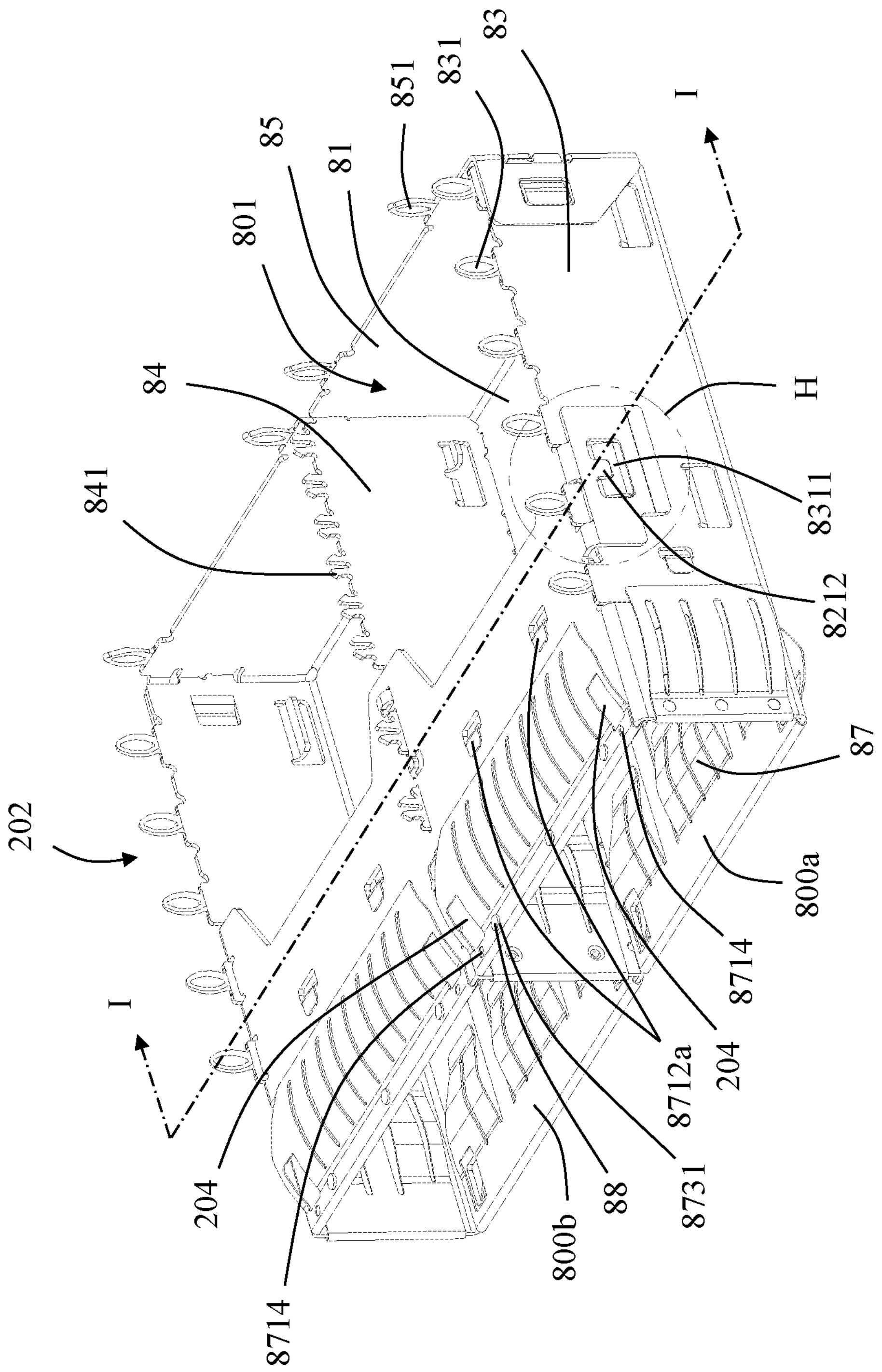
FIG. 25 is a perspective view of the metal cage in FIG. 22 from another angle.
Figure 26:
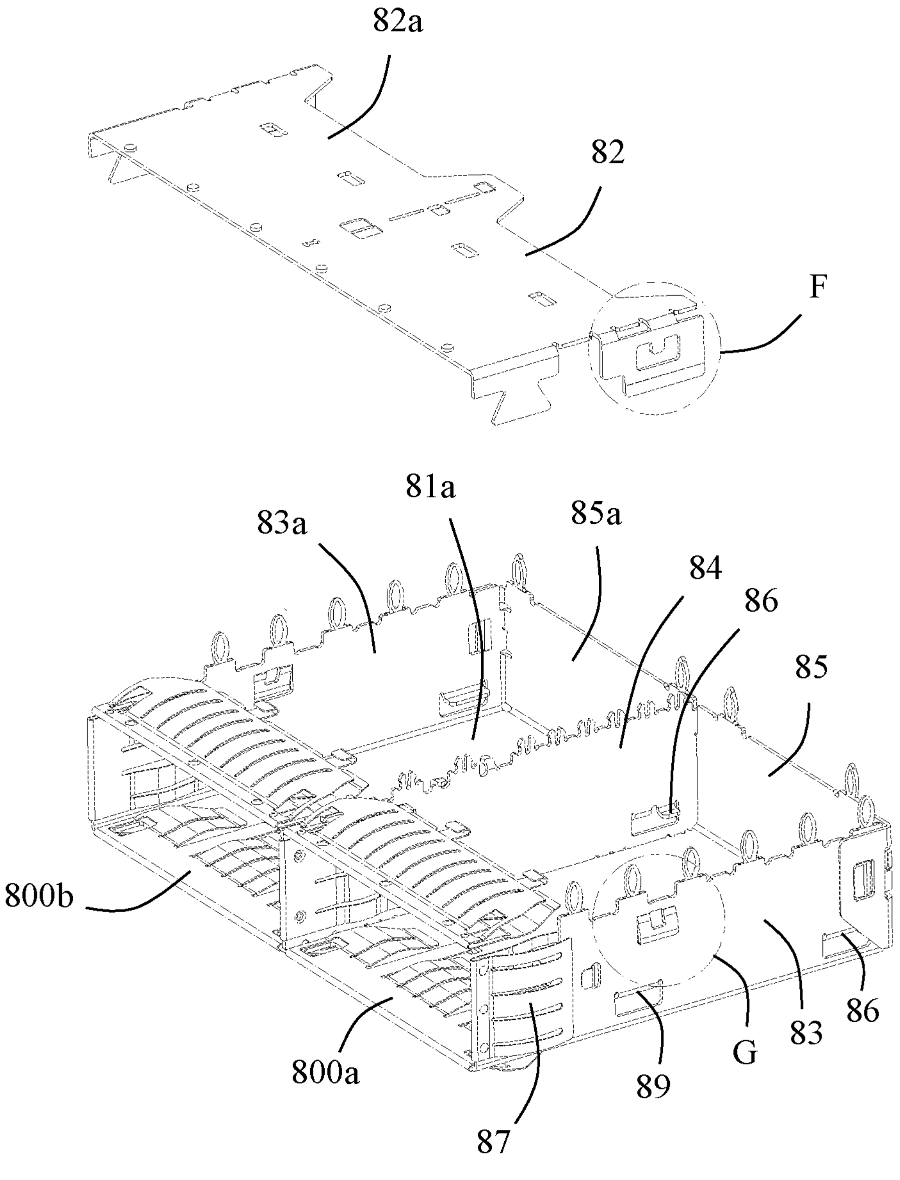
FIG. 26 is a partial perspective exploded view of FIG. 25.

The metal cage 202 includes a plurality of grounding springs 87 assembled to the first metal shell 8*a* and/or the second metal shell 8*b*. In the embodiment shown in the present disclosure, the plurality of grounding springs 87 include a first grounding spring 87*a*, a second grounding spring 87*b*, a third grounding spring 87*c*, and a fourth grounding spring 87*d*. The first grounding spring 87*a* is fixed to the first wall portion 81. The second grounding spring 87*b* is fixed to the second wall portion 82. The third grounding spring 87*c* is fixed to the third wall portion 83. The fourth grounding spring 87*d* is fixed to the fourth wall portion 84. Each grounding spring 87 includes a plurality of first elastic arms 871 protruding into the first insertion space 800*a*, a plurality of second elastic arms 872 located outside the first insertion space 800*a*, and a U-shaped connecting portion 873 connecting the plurality of first elastic arms 871 and the plurality of second elastic arms 872. The first grounding spring 87*a* and the second grounding spring 87*b* are symmetrically arranged on the upper and lower sides of the first insertion space 800*a*. Referring to FIG. 25, the first metal shell 8*a* and/or the second metal shell 8*b* are provided with positioning protrusions 88. The U-shaped connecting portion 873 of the first grounding spring 87*a* and/or the second grounding spring 87*b* is provided with a plurality of positioning holes 8731 mated with the positioning protrusions 88 to facilitate assembly and positioning. In the embodiment shown in the present disclosure, the first metal shell 8*a* and the second metal shell 8*b* are both provided with the positioning protrusions 88. The U-shaped connecting portions 873 of the first grounding spring 87*a* and the second grounding spring 87*b* are both provided with the positioning holes 8731 mated with the positioning protrusions 88.

Referring FIGS. 25 to 27 and FIG. 33, the plurality of first elastic arms 871 of the first grounding spring 87*a* and the second grounding spring 87*b* include a plurality of first arc-shaped arms 8711 and a plurality of first straight arms 8712. Each first straight arm 8712 includes a first flip portion 8712*a*. The first wall portion 81 and the second wall portion 82 include first retaining holes 203. The first flip portions 8712*a* pass through the first retaining holes 203 to be fixed on the metal cage 202. In the illustrated embodiment of the present disclosure, the first straight arms 8712 abuts against an inner side of the corresponding first wall portion 81 and an inner side of the second wall portion 82. The first arc-shaped arm 8711 protrudes into the first insertion space 800*a* to abut against the plug connector 100 so as to achieve grounding purpose and increase the insertion force. In the embodiment shown in the present disclosure, by disposing the first straight arms 8712, when the plug connector 100 is inserted into the first insertion space 800*a*, the first straight arms 8712 can be prevented from being excessively pressed to cause the first straight arms 8712 to be loosened.

The third grounding spring 87*c* includes a plurality of second arc-shaped arms 8715 and at least one second straight arm 8716. The at least one second straight arm 8716 includes a second flip portion 8716*a*. The third wall portion 83 includes a second retaining hole 205. The second flip portion 8716*a* passes through the second locking hole 205 to be fixed on the metal cage 202. In the illustrated embodiment of the present disclosure, the second straight arm 8716 abuts against an inner side of the third wall portion 83. The second arc-shaped arms 8715 protrude into the first insertion space 800*a* to abut against the plug connector 100 so as to achieve grounding purpose and increase the insertion force. In the embodiment shown in the present disclosure, by disposing the second straight arm 8716, when the plug connector 100 is inserted into the first insertion space 800*a*, the second straight arm 8716 can be prevented from being excessively pressed to cause the second straight arm 8716 to be loosened.

The metal cage 202 includes a locking groove 204 which is matched with the locking latch 411 of the plug connector 100. The first elastic arm 871 is provided with an escape groove 8713 corresponding to the locking groove 204. The at least one grounding spring 87 includes a soldering point 8714 located adjacent to the locking groove 204 and located at a front end of the locking groove 204 in the mating direction M of the plug connector 100. It is understandable to those skilled in the art that at the position where the locking latch 411 mates with the locking groove 204, when the plug connector 100 is unlocked and pulled out, the metal cage 202 and the first elastic arms 871 of the first grounding spring 87*a* are easily pulled. By arranging the soldering point 8714 adjacent to the locking groove 204 in the present disclosure, the structure can be strengthened without excessively increasing the manufacturing cost. Of course, in other embodiments of the present disclosure, the positioning protrusions 88 are matched with the positioning holes 8731 of the U-shaped connecting portion 873, and by fixing the first flip portion 8712*a* to the metal cage 202, the first elastic arm 871 of the present disclosure can even omit the soldering step, thereby reducing the difficulty of manufacturing.

Compared with the prior art, the present disclosure provides a first guide protrusion 89 protruding into the first insertion space 800*a*. When the plug connector 100 is inserted into the receptacle connector assembly 200, the first guide protrusion 89 supports and guides the extension plate 113 of the plug connector 100. When the plug connector 100 is inserted in place, the first guide protrusion 89 is inserted into the slot 13 of the plug connector 100, thereby improving the mating stability. In addition, in the present disclosure, by providing the first locking hole 8211 and the first buckle tab 8212 on the retaining portion 821, by providing the first locking protrusion 8311 and the first retaining groove 8312 on the at least one wall portion, by fixing the first locking protrusion 8311 in the first locking hole 8211, and by receiving the first buckle tab 8212 in the first retaining groove 8312, the first metal shell 8*a* and the second metal shell 8*b* are assembled and fixed, thereby reducing the risk of loosening of the first metal shell 8*a* and the second metal shell 8*b* and improving the structural reliability.

It should be noted that, in the present disclosure, a general concept of the receptacle connector assembly 200 is an electrical connector. In the embodiment shown in the present disclosure, the metal cage 202 of the electrical connector mainly plays a role of at least partially shielding the insulating body 6, while the connection relationship between the metal cage 202 and the insulating body 6 is not significantly important. It is understandable to those skilled in the art that, in other embodiments, in addition to the function of at least partially shielding the insulating body 6, the metal cage 202 of the electrical connector is also closely connected with the insulating body 6. For example, the insulating body 6 is installed and fixed in the metal cage 202. In addition, although the electrical connector is the receptacle connector assembly 200 in the illustrated embodiment of the present disclosure. In other embodiments, the electrical connector may also be a plug connector or any electrical connector with the metal cage 202.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A receptacle connector assembly, comprising:
a receptacle connector; and
a metal cage shielding the receptacle connector;
wherein the receptacle connector comprises an insulating body and a plurality of conductive terminals secured to the insulating body, the insulating body comprises an insertion surface and an insertion slot extending through the insertion surface, each conductive terminal comprises an elastic mating portion extending into the insertion slot, the elastic mating portion is configured to mate with a plug connector,
wherein the metal cage comprises a first insertion space and a first opening located at a first end of the first insertion space along a mating direction, the receptacle connector is accommodated in the metal cage through the first opening along a mounting direction perpendicular to the mating direction, the insertion slot communicates with the first insertion space;
wherein the metal cage comprises a first wall portion, a second wall portion opposite to the first wall portion, a third wall portion connected to the first wall portion, and a fourth wall portion opposite to the third wall portion; the first wall portion, the second wall portion, the third wall portion and the fourth wall portion are enclosed to form a first frame; the first insertion space extends through the first frame in a direction opposite to the mating direction; the third wall portion and/or the fourth wall portion is provided with a first guide protrusion which extends into the first insertion space, and the first guide protrusion is configured to be inserted into a slot of the plug connector;
wherein the first insertion space is disposed at one side of the insertion slot along the mating direction; the first guide protrusion is a rigid protrusion that is exposed in the first insertion space.

2. The receptacle connector assembly according to claim 1, further comprising a first chamber between the first wall portion and the insulating body, the third wall portion and/or the fourth wall portion being provided with a second guide protrusion extending into the first chamber, the first guide protrusion being configured to guide an extension plate of the plug connector, the second guide protrusion being configured to support the extension plate of the plug connector.

3. The receptacle connector assembly according to claim 2, wherein a height of the first guide protrusion and a height of the second guide protrusion are different.

4. The receptacle connector assembly according to claim 2, wherein each of the third wall portion and the fourth wall portion is provided with the first guide protrusion which extends into the first insertion space, and the first guide protrusions are punched from the third wall portion and the fourth wall portion, respectively.

5. The receptacle connector assembly according to claim 1, wherein the first guide protrusion is perpendicular to the third wall portion and the fourth wall portion.

6. The receptacle connector assembly according to claim 1, wherein the plurality of conductive terminals comprise a plurality of first conductive terminals and a plurality of second conductive terminals; the elastic mating portions of the plurality of conductive terminals comprise a plurality of first elastic mating portions each of which is provided on the first conductive terminals, and a plurality of second elastic mating portions each of which is provided on the second conductive terminals; the first elastic mating portions and the second elastic mating portions are located on opposite sides of the insertion slot.

7. The receptacle connector assembly according to claim 6, wherein the plurality of first conductive terminals comprise a plurality of first signal terminals and a plurality of first ground terminals, two adjacent first signal terminals form a first differential pair, each side of the first differential pair is provided with one first ground terminal; the receptacle connector further comprises a first ground connection piece, the first ground connection piece comprises a plurality of first protrusions arranged at intervals, the plurality of first protrusions are in contact with corresponding first ground terminals so as to connect all the first ground terminals in series; and wherein the plurality of second conductive terminals comprise a plurality of second signal terminals and a plurality of second ground terminals, two adjacent second signal terminals form a second differential pair, each side of the second differential pair is provided with one second ground terminal; the receptacle connector further comprises a second ground connection piece, the second ground connection piece comprises a plurality of second protrusions arranged at intervals, the plurality of second protrusions are in contact with corresponding second ground terminals so as to connect all the second ground terminals in series.

8. The receptacle connector assembly according to claim 1, wherein two receptacle connectors are provided and disposed side by side, the metal cage comprises a second insertion space disposed side by side with the first insertion space, and the first insertion space and the second insertion space are separated by the fourth wall portion.

9. The receptacle connector assembly according to claim 1, wherein the metal cage comprises a grounding spring fixed to at least one of the first wall portion, the second wall portion, the third wall portion and the fourth wall portion; the grounding spring is disposed adjacent to an insertion port of the first insertion space; the grounding spring comprises at least one first elastic arm protruding into the first insertion space and at least one second elastic arm located outside the first insertion space.

10. A connector assembly, comprising:

a plug connector comprising:

a housing comprising a mating surface;

a built-in circuit board partially located in the housing, the built-in circuit board comprising a tongue plate and a plurality of conductive pads located on the tongue plate; and a cable electrically connected to the built-in circuit board;

wherein the housing comprises an extension plate extending in a mating direction of the plug connector, both the tongue plate and the extension plate extend beyond the mating surface along the mating direction, and the extension plate extends beyond the tongue plate along the mating direction;

at least one side of the plug connector further defines a slot extending through the mating surface; and a receptacle connector assembly comprising:

a receptacle connector; and a metal cage shielding the receptacle connector;

wherein the receptacle connector comprises an insulating body and a plurality of conductive terminals secured to the insulating body, the insulating body comprises an insertion surface and an insertion slot extending through the insertion surface, each conductive terminal comprises an elastic mating portion extending into the insertion slot;

wherein the metal cage comprises a first insertion space and a first opening located at a first end of the first insertion space along a mating direction, the receptacle connector is accommodated in the metal cage through the first opening, the insertion slot communicates with the first insertion space;

wherein the metal cage comprises a first wall portion, a second wall portion opposite to the first wall portion, a third wall portion connected to the first wall portion, and a fourth wall portion opposite to the third wall portion; the first wall portion, the second wall portion, the third wall portion and the fourth wall portion are enclosed to form a first frame; the first insertion space extends through the first frame in a direction opposite to the mating direction; the third wall portion and/or the fourth wall portion is provided with a first guide protrusion which extends into the first insertion space, and the first guide protrusion is configured to be inserted into a slot of a plug connector;

wherein when the plug connector is inserted into the receptacle connector assembly, the first guide protrusion supports and guides the extension plate; and when the plug connector is inserted in place, the tongue plate is inserted into the insertion slot, the elastic mating portions of the conductive terminals engage with the conductive pads, and the first guide protrusion is inserted into the slot.

11. The connector assembly according to claim 10, wherein the plug connector comprises a locking arm and a return spring cooperating with the locking arm, the locking arm comprises a locking latch, and the metal cage comprises a locking slot mating with the locking latch.

12. The connector assembly according to claim 10, wherein the receptacle connector assembly comprises a first chamber between the first wall portion and the insulating body, the third wall portion and/or the fourth wall portion is provided with a second guide protrusion extending into the first chamber, the first guide protrusion is configured to guide an extension plate of the plug connector, the second guide protrusion is configured to support the extension plate of the plug connector.

13. The connector assembly according to claim 12, wherein a height of the first guide protrusion and a height of the second guide protrusion are different.

14. The connector assembly according to claim 12, wherein each of the third wall portion and the fourth wall portion is provided with the first guide protrusion which extends into the first insertion space, and the first guide protrusions are punched from the third wall portion and the fourth wall portion, respectively.

15. The connector assembly according to claim 10, wherein the first guide protrusion is perpendicular to the third wall portion and the fourth wall portion.

16. The connector assembly according to claim 10, wherein the plurality of conductive terminals comprise a plurality of first conductive terminals and a plurality of second conductive terminals; the elastic mating portions of the plurality of conductive terminals comprise a plurality of first elastic mating portions each of which is provided on the first conductive terminals, and a plurality of second elastic mating portions each of which is provided on the second conductive terminals; the first elastic mating portions and the second elastic mating portions are located on opposite sides of the insertion slot.

17. The connector assembly according to claim 16, wherein the plurality of first conductive terminals comprise a plurality of first signal terminals and a plurality of first ground terminals, two adjacent first signal terminals form a first differential pair, each side of the first differential pair is provided with one first ground terminal; the receptacle connector further comprises a first ground connection piece, the first ground connection piece comprises a plurality of first protrusions arranged at intervals, the plurality of first protrusions are in contact with corresponding first ground terminals so as to connect all the first ground terminals in series; and wherein the plurality of second conductive terminals comprise a plurality of second signal terminals and a plurality of second ground terminals, two adjacent second signal terminals form a second differential pair, each side of the second differential pair is provided with one second ground terminal; the receptacle connector further comprises a second ground connection piece, the second ground connection piece comprises a plurality of second protrusions arranged at intervals, the plurality of second protrusions are in contact with corresponding second ground terminals so as to connect all the second ground terminals in series.

18. The connector assembly according to claim 10, wherein two receptacle connectors are provided and disposed side by side, the metal cage comprises a second insertion space disposed side by side with the first insertion space, and the first insertion space and the second insertion space are separated by the fourth wall portion.

19. A receptacle connector assembly, comprising:

a receptacle connector; and a metal cage shielding the receptacle connector;

wherein the receptacle connector comprises an insulating body and a plurality of conductive terminals secured to the insulating body, the insulating body comprises an insertion surface and an insertion slot extending through the insertion surface, each conductive terminal comprises an elastic mating portion extending into the insertion slot;

wherein the metal cage comprises a first insertion space and a first opening located at a first end of the first insertion space along a mating direction, the receptacle connector is accommodated in the metal cage through the first opening, the insertion slot communicates with the first insertion space;

wherein the metal cage comprises a first wall portion, a second wall portion opposite to the first wall portion, a third wall portion connected to the first wall portion, and a fourth wall portion opposite to the third wall portion; the first wall portion, the second wall portion, the third wall portion and the fourth wall portion are enclosed to form a first frame; the first frame is provided with a guide protrusion which extends into the first insertion space, and the guide protrusion is configured to support an extension plate of a plug connector;

wherein the receptacle connector assembly further comprises a first slot located between the first wall portion and the insulating body, the guide protrusion comprises a second guide protrusion protruding from the third wall portion and/or the fourth wall portion into the first slot, the second guide protrusion is configured to support a free end of the extension plate of the plug connector.

20. The receptacle connector assembly according to claim 19, wherein the plurality of conductive terminals comprise a plurality of first conductive terminals and a plurality of second conductive terminals; the elastic mating portions of the plurality of conductive terminals comprise a plurality of first elastic mating portions each of which is provided on the first conductive terminals, and a plurality of second elastic mating portions each of which is provided on the second conductive terminals; the first elastic mating portions and the second elastic mating portions are located on opposite sides of the insertion slot.

* * * * *